(12) United States Patent
Du et al.

(10) Patent No.: US 7,890,741 B2
(45) Date of Patent: Feb. 15, 2011

(54) LOW POWER DIGITAL AUDIO DECODING/PLAYING SYSTEM FOR COMPUTING DEVICES

(75) Inventors: Sterling Du, Palo Alto, CA (US); James Lam, Fremont, CA (US); Bruce Denning, Monterey, CA (US)

(73) Assignee: O2Micro International Limited, Grand Cayman (KY)

( * ) Notice: Subject to any disclaimer, the term of this patent is extended or adjusted under 35 U.S.C. 154(b) by 1178 days.

(21) Appl. No.: 10/406,949

(22) Filed: Apr. 3, 2003

(65) Prior Publication Data

US 2004/0006690 A1    Jan. 8, 2004

Related U.S. Application Data

(63) Continuation-in-part of application No. 10/272,740, filed on Oct. 17, 2002, now Pat. No. 7,522,966, which is a continuation-in-part of application No. 10/208,728, filed on Jul. 30, 2002, now Pat. No. 7,522,965, which is a continuation-in-part of application No. 09/969,060, filed on Oct. 2, 2001, now Pat. No. 7,522,964, which is a continuation-in-part of application No. 09/921,171, filed on Aug. 2, 2001, now Pat. No. 7,526,349.

(60) Provisional application No. 60/250,899, filed on Dec. 1, 2000, provisional application No. 60/265,466, filed on Jan. 30, 2001.

(51) Int. Cl.
*G06F 9/00* (2006.01)
*G06F 9/24* (2006.01)
*G06F 15/177* (2006.01)

(52) U.S. Cl. ................................. 713/1; 713/2; 713/100

(58) Field of Classification Search ................. 719/327; 709/208, 223, 224; 713/1, 2, 100
See application file for complete search history.

(56) References Cited

U.S. PATENT DOCUMENTS 4,348,696 A    9/1982    Beier ........................ 358/188

(Continued)

FOREIGN PATENT DOCUMENTS

EP    0099549 A2    2/1984

(Continued)

OTHER PUBLICATIONS

"How Do I Boot Into Safe Mode?", Laplink, Feb. 9, 2001, retrieved from the World Wide Web: http://web.archive.org/web/20010418002737/http://laplink.com/support/kb/article.asp?ID=102.*

(Continued)

*Primary Examiner*—Ji H Bae

(57) ABSTRACT

A computer system includes a system CPU responsive to a control signal to load a first operating system or a second operating system. The first operating system is run by the computer system in a first operation mode and the second operating system is run by the computer system in a second entertainment mode. A PC operating in an entertainment mode may operate a variety of entertainment software applications. A quick boot process is also provided. The quick boot process may include an accelerated BIOS boot process that defers and delays appropriate tasks. The quick boot process may also include: detecting a condition; performing a BIOS boot process; loading an image file associated with the condition; and executing the image file associated with the condition. The condition may be that associated hardware is unchanged from a previous boot. A parental control system is also disclosed.

14 Claims, 10 Drawing Sheets

U.S. PATENT DOCUMENTS

| | | | | |
|---|---|---|---|---|
| 4,554,584 A | | 11/1985 | Elam et al. | 358/165 |
| 4,747,041 A | | 5/1988 | Engel et al. | 364/200 |
| 4,851,987 A | | 7/1989 | Day | 364/200 |
| 4,968,987 A | | 11/1990 | Naka et al. | 341/143 |
| 4,999,634 A | | 3/1991 | Brazdrum et al. | 341/172 |
| 5,065,309 A | | 11/1991 | Putnam et al. | 364/419 |
| 5,142,684 A | | 8/1992 | Perry et al. | 395/750 |
| 5,167,024 A | | 11/1992 | Smith et al. | 395/375 |
| 5,200,913 A | | 4/1993 | Hawkins et al. | 364/708 |
| 5,218,704 A | | 6/1993 | Watts, Jr. et al. | 395/750 |
| 5,325,532 A | * | 6/1994 | Crosswy et al. | 713/2 |
| 5,375,076 A | | 12/1994 | Goodrich et al. | 364/708.1 |
| 5,382,983 A | | 1/1995 | Kwoh et al. | 348/716 |
| 5,386,552 A | | 1/1995 | Garney | 395/575 |
| 5,504,905 A | * | 4/1996 | Cleary et al. | 713/100 |
| 5,511,203 A | | 4/1996 | Wisor et al. | 395/750 |
| 5,548,777 A | | 8/1996 | Woo | 395/821 |
| 5,560,024 A | | 9/1996 | Harper et al. | 395/750 |
| 5,579,524 A | | 11/1996 | Kikinis | 395/750 |
| 5,600,800 A | | 2/1997 | Kikinis et al. | 395/281 |
| 5,619,402 A | | 4/1997 | Liu | 363/20 |
| 5,634,137 A | * | 5/1997 | Merkin et al. | 710/10 |
| 5,634,798 A | | 6/1997 | Suh | 434/307 |
| 5,642,417 A | | 6/1997 | Stringer | 380/4 |
| 5,643,798 A | | 7/1997 | Beavis et al. | |
| 5,646,699 A | | 7/1997 | Oh et al. | 348/553 |
| 5,671,368 A | | 9/1997 | Chan et al. | 395/282 |
| 5,692,197 A | | 11/1997 | Narad et al. | 395/750 |
| 5,696,975 A | | 12/1997 | Moore et al. | 395/712 |
| 5,699,244 A | | 12/1997 | Clark, Jr. et al. | 364/420 |
| 5,708,840 A | | 1/1998 | Kikinis et al. | 395/800 |
| 5,732,266 A | | 3/1998 | Moore et al. | 395/651 |
| 5,790,875 A | | 8/1998 | Andersin et al. | 395/750.03 |
| 5,796,705 A | | 8/1998 | Kim | 369/124 |
| 5,797,089 A | | 8/1998 | Nguyen | 455/403 |
| 5,815,679 A | | 9/1998 | Liu | 395/309 |
| 5,819,116 A | | 10/1998 | Maupin et al. | 395/888 |
| 5,822,598 A | | 10/1998 | Lam | 395/750.06 |
| 5,835,759 A | | 11/1998 | Moore et al. | 395/651 |
| 5,838,983 A | | 11/1998 | Atkinson | 395/750.06 |
| 5,870,355 A | | 2/1999 | Fujihara | 369/32 |
| 5,903,764 A | | 5/1999 | Shyr et al. | 395/750.01 |
| 5,903,871 A | | 5/1999 | Terui et al. | |
| 5,910,933 A | | 6/1999 | Moore | 369/33 |
| 5,940,854 A | | 8/1999 | Green, Jr. et al. | |
| 5,964,878 A | | 10/1999 | Ryu | 713/323 |
| 5,969,529 A | | 10/1999 | Eiraku et al. | 324/433 |
| 5,974,549 A | | 10/1999 | Golan | 713/200 |
| 5,983,073 A | | 11/1999 | Ditzik | 455/11.1 |
| 5,999,730 A | | 12/1999 | Lewis | 395/702 |
| 6,006,285 A | * | 12/1999 | Jacobs et al. | 710/14 |
| 6,006,337 A | | 12/1999 | Koo | 713/324 |
| 6,018,724 A | | 1/2000 | Arent | 705/44 |
| 6,025,869 A | * | 2/2000 | Stas et al. | 725/28 |
| 6,034,621 A | | 3/2000 | Kaufman | 340/825.44 |
| 6,038,672 A | | 3/2000 | Klein | 713/322 |
| 6,047,223 A | | 4/2000 | Sartori | 700/83 |
| 6,047,342 A | | 4/2000 | Depew | 710/102 |
| 6,047,380 A | | 4/2000 | Nolan et al. | 713/324 |
| 6,061,306 A | | 5/2000 | Buchheim | |
| 6,061,452 A | | 5/2000 | Suzuki | 380/231 |
| 6,076,133 A | | 6/2000 | Brainard et al. | 710/260 |
| 6,078,725 A | | 6/2000 | Tanaka | |
| 6,088,730 A | | 7/2000 | Kato et al. | 709/227 |
| 6,088,809 A | | 7/2000 | Atkinson | 713/324 |
| 6,101,562 A | | 8/2000 | Chang et al. | 710/73 |
| 6,122,619 A | | 9/2000 | Kolluru et al. | |
| 6,125,417 A | | 9/2000 | Bailis et al. | 710/103 |
| 6,141,052 A | | 10/2000 | Fukumitsu et al. | 348/373 |
| 6,151,012 A | | 11/2000 | Bullister | 345/168 |
| 6,154,359 A | | 11/2000 | Kamikakai et al. | 361/681 |
| 6,163,647 A | | 12/2000 | Terashima et al. | |
| 6,173,417 B1 | | 1/2001 | Merrill | 714/15 |
| 6,195,713 B1 | | 2/2001 | Chaiken et al. | 710/19 |
| 6,202,121 B1 | | 3/2001 | Walsh et al. | 711/100 |
| 6,209,088 B1 | | 3/2001 | Reneris | 713/1 |
| 6,226,237 B1 | | 5/2001 | Chan et al. | 369/33 |
| 6,233,464 B1 | | 5/2001 | Chmaytelli | 455/556 |
| 6,252,511 B1 | | 6/2001 | Mondshine et al. | 340/636 |
| 6,259,597 B1 | | 7/2001 | Anzai et al. | 361/683 |
| 6,266,714 B1 | | 7/2001 | Jacobs et al. | 710/14 |
| 6,272,575 B1 | | 8/2001 | Rajchel | 710/102 |
| RE37,367 E | | 9/2001 | Wachi et al. | |
| 6,292,440 B1 | | 9/2001 | Lee | 369/7 |
| 6,304,261 B1 | | 10/2001 | Shields et al. | 345/358 |
| 6,307,631 B1 | | 10/2001 | Tazartes et al. | |
| 6,310,634 B1 | | 10/2001 | Bodnar et al. | 345/854 |
| 6,332,175 B1 | | 12/2001 | Birrell et al. | 711/112 |
| 6,334,149 B1 | | 12/2001 | Davis, Jr. et al. | 709/219 |
| 6,336,142 B1 | | 1/2002 | Kato et al. | 709/227 |
| 6,344,149 B1 | | 2/2002 | Oles | |
| 6,349,386 B1 | | 2/2002 | Chan | 713/323 |
| 6,356,905 B1 | | 3/2002 | Gershman et al. | 707/10 |
| 6,370,631 B1 | | 4/2002 | Dye | 711/170 |
| 6,377,530 B1 | | 4/2002 | Burrows | 369/69.12 |
| 6,378,010 B1 | | 4/2002 | Burks | 710/68 |
| 6,378,077 B1 | | 4/2002 | Atkinson | 713/324 |
| 6,380,968 B1 | | 4/2002 | Alexander et al. | |
| 6,385,734 B2 | | 5/2002 | Atkinson | 713/324 |
| 6,393,499 B1 | | 5/2002 | Chaiken et al. | 710/19 |
| 6,404,418 B1 | | 6/2002 | Leem | |
| 6,412,075 B1 | | 6/2002 | Klein | 713/322 |
| 6,434,696 B1 | * | 8/2002 | Kang | 713/2 |
| 6,434,697 B1 | * | 8/2002 | Leyda et al. | 713/2 |
| 6,446,073 B1 | | 9/2002 | D'Amato et al. | 707/202 |
| 6,493,828 B1 | | 12/2002 | Yamaguchi et al. | |
| 6,502,194 B1 | * | 12/2002 | Berman et al. | 726/28 |
| 6,647,435 B1 | | 11/2003 | Koh et al. | 710/14 |
| 6,654,827 B2 | | 11/2003 | Zhang et al. | |
| 6,675,233 B1 | | 1/2004 | Du et al. | 710/14 |
| 6,711,631 B1 | | 3/2004 | Chan et al. | |
| 6,718,401 B2 | | 4/2004 | Nalawadi et al. | |
| 6,718,461 B1 | * | 4/2004 | Ewertz | 713/1 |
| 6,721,489 B1 | | 4/2004 | Benyamin et al. | |
| 6,721,885 B1 | * | 4/2004 | Freeman et al. | 713/2 |
| 6,754,817 B2 | * | 6/2004 | Khatri et al. | 713/1 |
| 6,763,458 B1 | | 7/2004 | Watanabe et al. | |
| 6,819,961 B2 | | 11/2004 | Jacobs et al. | |
| 6,883,091 B2 | * | 4/2005 | Morrison et al. | 713/2 |
| 7,098,899 B1 | | 8/2006 | Ginosar | |
| 7,149,692 B1 | * | 12/2006 | Wu | 704/270 |
| 7,213,139 B2 | * | 5/2007 | Zhang | 713/1 |
| 2001/0028562 A1 | | 10/2001 | Naghi | 362/85 |
| 2002/0010819 A1 | | 1/2002 | Dye | 710/68 |
| 2002/0068988 A1 | | 6/2002 | Chan et al. | 700/94 |
| 2002/0093886 A1 | | 7/2002 | Ijichi et al. | |
| 2002/0157007 A1 | | 10/2002 | Sashihara | |
| 2002/0162444 A1 | * | 11/2002 | Yu et al. | 84/601 |
| 2003/0093659 A1 | * | 5/2003 | Wen et al. | 713/1 |
| 2003/0188144 A1 | * | 10/2003 | Du et al. | 713/1 |
| 2004/0064686 A1 | * | 4/2004 | Miller et al. | 713/1 |
| 2004/0177228 A1 | | 9/2004 | Leonhardt et al. | |
| 2004/0226020 A1 | | 11/2004 | Birmingham | 719/310 |

FOREIGN PATENT DOCUMENTS

| | | | |
|---|---|---|---|
| EP | 0706291 A2 | 10/1994 | |
| EP | 0685824 | 5/1995 | |
| EP | 0825519 | 2/1998 | 1/26 |
| EP | 0840528 A2 | 5/1998 | |
| EP | 0658843 | 6/1998 | |
| EP | 0982732 A1 | 8/1999 | |
| EP | 0945778 | 9/1999 | |
| EP | 0945778 A2 | 9/1999 | |

| | | | |
|---|---|---|---|
| EP | 0982732 | | 3/2000 |
| EP | 0982732 | A1 | 3/2000 |
| EP | 0999549 | | 5/2000 |
| EP | 1003173 | A1 | 5/2000 |
| EP | 00300988.3 | A2 | 8/2000 |
| EP | 1028425 | A2 | 8/2000 |
| JP | 06-085824 | | 3/1994 |
| JP | 08-036825 | | 2/1996 |
| JP | H08-111082 | | 4/1996 |
| JP | 09-101848 | | 4/1997 |
| JP | 10-283195 | | 10/1998 |
| JP | 11-119875 | | 4/1999 |
| JP | 11-150707 | | 6/1999 |
| JP | 11-175099 | | 7/1999 |
| JP | 2000020285 | | 1/2000 |
| JP | 2000-105598 | | 4/2000 |
| JP | 2000251486 | | 9/2000 |
| JP | 2001189659 | | 7/2001 |
| JP | 2002112181 | B2 | 4/2002 |
| JP | 2002176578 | | 6/2002 |
| WO | WO 96/38841 | | 12/1996 |
| WO | WO 01/61442 | A1 | 8/2001 |
| WO | 0245319 | A2 | 6/2002 |
| WO | 0245319 | A3 | 6/2002 |

OTHER PUBLICATIONS

"Multi-Booter mit Windows 9X, Windows NT 4.0 und Linux", Mar. 26, 2000, retrieved from the World Wide Web: http://web.archive.org/web/20101202172805/http://www.martin-bock.de/p-c/pc-0004.html.*

Translation of "Multi-Booter mit Windows 9X, Windows NT 4.0 und Linux" from Google Translate, Dec. 2, 2010, retrieved from the World Wide Web: http://translate.google.com/translate?js=n&prev=_t&hl=en&ie=UTF-8&layout=2&eotf=1&sl=de&tl=en&u=http%3A%2F%2Fweb.archive.org%2Fweb%2F20101202172805%2Fhttp%3A%2F%2Fwww.martin-bock.de%2Fp-c%2Fpc-0004.html.*

English language abstract of JP H08-111082 (1 Page).

English translation of Official Inquiry received in Japan Application No. 2002-546339 dated Feb. 24, 2009 (7 pages).

Translation of Office Action received in Japan Application No. 2007-140929 dated Jun. 24, 2008 (4 pages).

Translation of Office Action received in Japan Application No. 2007-140930 dated Jun. 24, 2008 (5 pages).

Anonymous: "OZ163 AudioDJ", O2Micro - News - Archives, Internet Citation, 6, Apr. 1998, p. 1, XP007912279, www.o2micro.com/news/pr_980406_2_.html.

Anonymous "OZ165 Next Generation AudioDJ," O2Micro - News - Archives, Internet Citation, Oct. 28, 1999, p. 1, XP007912280, www.o2micro.com/news/pr_991028.html.

Bostroem Tomas et al., "Mobile Audio Distribution," Personal and Ubiquitous Computing, Springer Verlag, London, GB, vol. 3, No. 4, 1 Dec. 1999, pp. 166-172, XP007912339.

Supplementary EPO Search Report, Mar. 31, 2010.

* cited by examiner

LOW POWER DIGITAL AUDIO DECODING/PLAYING SYSTEM FOR COMPUTING DEVICES

CROSS REFERENCE TO RELATED APPLICATIONS

This application is a continuation-in-part application of U.S. Nonprovisional application Ser. No. 10/272,740 filed on Oct. 17, 2002, now U.S. Pat. No. 7,522,966 which is a continuation-in-part of Nonprovisional application Ser. No. 10/208,728 filed on Jul. 30, 2002, now U.S. Pat. No. 7,522,965 which is a continuation-in-part of U.S. application Ser. No. 09/969,060 filed on Oct. 2, 2001, now U.S. Pat. No. 7,522,964 which is a continuation-in-part of U.S. application Ser. No. 09/921,171 filed on Aug. 2, 2001 now U.S. Pat. No. 7,526,349 all the teachings of which are incorporated herein by reference, which claim the benefit of U.S. Provisional Application Nos. 60/250,899 filed Dec. 1, 2000, and 60/265,466 filed Jan. 30, 2001, all the teachings of which are incorporated herein by reference.

BACKGROUND OF THE INVENTION

1. Field of the Invention

The present invention relates generally to portable devices (e.g., notebook computers) for reproducing audio and video recordings, and more particularly, to low-power hardware and/or software for decoding and reproducing compressed audio recordings and video recordings in a variety of compression formats from a variety of sources. A quick boot sequence and parental control circuit are also provided.

2. Description of Related Art

Presently there exist various portable devices for replaying digital audio recordings that have been compressed in accordance with one or more compressed audio digital recording formats, e.g., MPEG (Moving Picture Experts Group) Audio Layer-3 (MP3), Windows® Media Audio (WMA), and Advanced Audio Coding (AAC). To date, the most popular format has been MP3, a compression scheme that results in about a 10:1 compression of the size of digital music files. These devices can be divided into two classes, those which store the compressed digital audio recordings in an electronic solid-state memory, and those which record the compressed digital audio for subsequent reproduction using an electromechanical device such as a compact disk ("CD") player or on a hard disk drive of a digital computer.

For example, portable devices for playing MP3 compressed digital audio recordings that use electronic solid-state memory, e.g., flash-memory, are capable of storing about ten (10) music selections. With an add-in memory card, such devices can carry a total of about twenty (20) music selections. These MP3 players that store the MP3 compressed digital audio recordings in an electronic solid-state memory consume comparatively little electrical power. Thus, such MP3 players provide an extended playing interval without having to power the computer's CD-ROM or hard disk drive.

U.S. Pat. No. 6,226,237, entitled "Low Power CD-ROM Player for Portable Computers", issued May 1, 2001 (the "'237" patent), which is hereby incorporated by reference in its entirety, describes how a conventional notebook computer, when simply playing a conventional music CD, consumes an unnecessarily large amount of electrical energy. That is largely due to the large number of background functions that are unrelated to the playing of music that the Operating System (e.g., Windows®) is performing whenever the computer is turned on. That excessive electrical energy consumption for functions unrelated to the function the user is performing at the moment, i.e., playing music, quickly drains the battery of a notebook computer of power that could more prudently be applied at another time in performance of microprocessor intensive tasks such as word processing and spreadsheet analysis. The solution presented in the '237 patent is a state machine that operates when main power to the portable device is OFF. The invention of the '237 patent couples a CD-ROM to the audio subsystem (when main power is OFF) so that CDs can be played, without excessive battery drain, or without having to boot up the portable computer.

The prior art also includes silicon solutions that are dedicated function integrated circuits (ICs) or incorporated into application-specific integrated circuits, or ASICs. These are usually expensive solutions as the digital signal processor (DSP) required in a dedicated chip results in a large, costly integrated circuit. One of the results is the use of a larger amount of PCB (printed circuit board) space.

Further, the 15 to 20 MIPS (million instructions per second) decode engine known in the art must be continuously running to generate the audio stream for the Codec. Additionally, the dedicated decode engine needs to have the high-power-consuming hard disk drive (HDD) continuously operating. These approaches are limited to functioning only with MP3 compression, thereby eliminating the opportunity to adapt the system to newly emerging music compression algorithms, such as Microsoft's WMA or the music industry's proposed Secure Digital Music Initiative (SDMI) for secure audio.

Dedicated silicon solutions known in the art employ a DSP that must constantly be decoding the compressed audio files from a hard disk drive, which must therefore be constantly reading the audio files. Such known methods require much power, resulting in a fast battery discharge, (e.g., much faster than the possible 4 to 10 hours of desired use on a transoceanic flight).

Thus, known hardware MP3 decoder and players requiring an IC implementation and a hard disk drive being accessed non-stop are high in power consumption, difficult to upgrade, and expensive.

The present invention provides a solution that is low in power consumption, can be upgraded in the field for various music compression formats, is expected to cost no more than half the cost of the currently available hardware implementation, and may be made capable of playing up to hundreds of musical selections, while only having to access the HDD or CD-ROM less than 0.5% of the time.

SUMMARY OF THE INVENTION

A computer system consistent with the present invention includes a system CPU responsive to a control signal to load a first operating system or a second operating system. The first operating system is run by the computer system in a first operation mode and the second operating system is run by the computer system in a second entertainment mode. A PC operating in an entertainment mode may operate a variety of entertainment software applications such as DVD playback applications, TV applications, digital device applications, remote control application, voice recording applications, or audio playback applications.

In another embodiment consistent with the invention, a method of quickly booting a PC is provided. The method includes the steps of: detecting a condition; performing a BIOS boot process; loading an image file associated with the condition; and executing the image file associated with the condition.

In yet another embodiment, a method of quickly booting a mini-OS configured to run a PC in an entertainment mode is provided. The method includes the steps of: determining entertainment mode is desired; detecting a condition; performing a BIOS boot process; loading an image file associated with the condition; and executing the image file associated with the condition to thereby load the mini-OS to enable operation of the PC in the entertainment mode.

In yet a further embodiment, an accelerated BIOS boot consistent with the invention includes: identifying a task that may be skipped; skipping the task; identifying a deferrable task that may be deferred; and deferring the deferrable task to a later time.

In yet a further embodiment, a parental control circuit is provided having a host interface configured to communicate with a host computer system, a storage device interface configured to communicate with an associated external storage device, and an engine configured to provide for secure communication between the associated external storage device and the host computer system.

In yet a further embodiment, a computer system enabling parental control of access to data is provided. The computer system includes a computer host subsystem including a system CPU, an operating system, and a slot. The computer system also includes a parental control system including a storage device and a parental control circuit. The storage device includes instructional data, and the storage device is configured to fit into the slot of the computer host subsystem. The parental control circuit is configured to accept a first coded signal representative of the instructional data on the storage device and provide a second decoded signal to the operating system representative of the instructional data, wherein the operating system is responsive to the second decoded signal to control access to applications of the computer host subsystem based on the second decoded signal.

In yet a further embodiment, a computer system consistent with the invention includes a system CPU responsive to a control signal to load a first operating system or a second operating system, wherein the first operating system is run by the computer system in a first operation mode and the second operating system is run by the computer system in a second entertainment mode. The computer system also includes a parental control circuit configured to provide secure communication between an external storage device and the second operating system, the external storage device includes instructional data for an associated user regarding limits to operation of the computer system in the entertainment mode.

In another embodiment of the present invention, a method of accessing data on a computer system is provided. The method includes: selecting compressed data from a drive of a computer system having at least the drive, a CPU, and a memory; reading the compressed data; providing the compressed data to the CPU for decompressing the compressed data, thereby providing decompressed data; and storing the decompressed data in the memory.

In yet a further embodiment of the invention, a computer system adapted to access data is provided. The computer system includes compressed data residing in one or more files; at least one selection key configured to enable a user to select at least one of the files; a system CPU; a controller; and an operating system comprising file management software. The file management software is configured to manage the files and to permit the user to access the files via the at least one selection key. The operating system is also configured to control the controller and the CPU to cause the CPU to decompress the at least one file selected by the user.

In yet a further embodiment of the invention, a computer system adapted to access compressed data is provided. The computer system includes a system CPU; memory; at least one drive having compressed data; a first operating system configured to control at least the system CPU and the memory; and a second operating system configured to cause the system CPU to decompress the compressed data into decompressed data and store the decompressed data in the memory.

DETAILED DESCRIPTION OF EXEMPLARY EMBODIMENTS

In one embodiment, a computer system consistent with the invention includes a mini-OS (operating system) software and a hardware interface (special purpose circuit) between the South Bridge and Codec to play the musical selections (or other stored audio) desired by the user. In another embodiment, no hardware is needed as the computer system employs a software only solution.

The mini-OS software of the present invention performs only those functions and enables those elements of the portable computer that are needed, when they are needed, to play the selected music, without performing all of the background functions performed by the full system operating system, e.g., Windows®, and without accessing the monitor circuitry and monitor screen of the portable computer. Additionally, the mini-OS of the present invention only accesses the HDD when compressed files are being transferred to RAM. Thus, it will be seen that the mini-OS software portion of the present invention performs both power saving and file management functions when playing audio.

Figure 1:
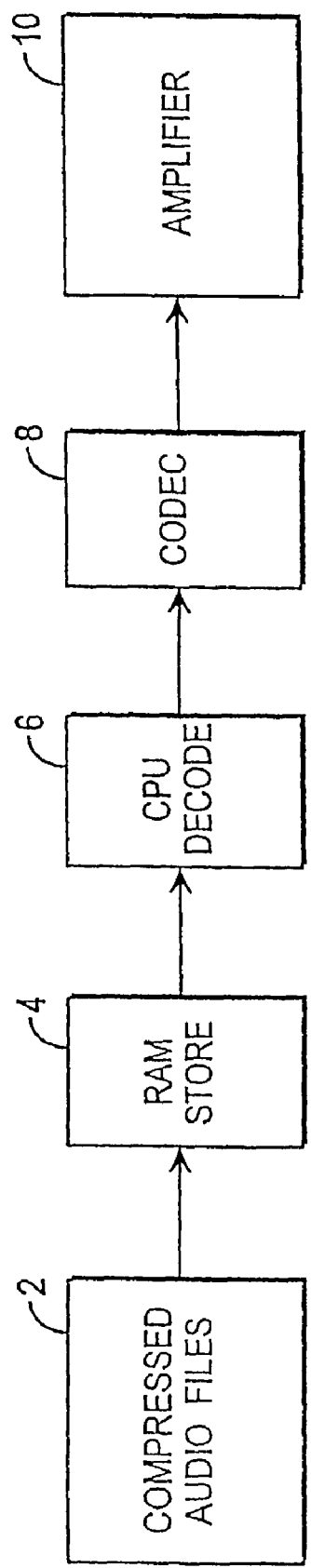
FIG. 1 is a block diagram representation an exemplary operational flow of one embodiment of the present invention.

FIG. 1 is a block diagram representation of the operational flow of the exemplary software compressed audio player in one embodiment of the present invention.

The operational concept illustrated in FIG. 1 is as follows:

1st: A browser, running on a full system operating system, e.g., Windows®, of the portable computer is initially used to download compressed music files (for example 1000 songs) onto the PC hard disk drive (HDD) (2) (e.g., using 4 gigabytes of HDD space) at some time prior to the time at which the user desires to use the portable computer as an audio player and a playlist is created, comprising the songs the user desires to hear at a later time;

2nd: When the user desires to use the portable computer as an audio player, once the desired music files are on the HDD, the user operates an audio player on-switch to turn the portable computer fully on, boot up the entire computer, load in the mini-OS of the present invention instead of the usual Microsoft Windows® OS (the full system operating system is not opened) with the power saving initialization subroutines and initializes only those portions of the portable computer as necessary, and the file management subroutines initialize the song play list or book generated in step 1, of a substantial number of songs, for desired music listening under direction of the user;

3rd: The mini-OS software is then copied from the HDD (2) to RAM (4), and then the first set of compressed files from the song play list is copied from the HDD (2) to the system RAM (4) also using the mini-OS software of the present invention. For example, in today's PC's 128 Mbytes is a typical system RAM size, with the mini-OS software of the present invention taking about 8 Mbytes of the RAM, leaving approximately 120 Mbytes for use as a compressed music memory (i.e., a cache or buffer, using system memory, dedicated memory, or other memory). That 120 Mbytes represents about 2 hours of continuous compressed music with a compression ration of 10:1, typical of MP3 files. Similarly, in the case when flash media is used for MP3 storage, all or most of the contents of the flash media card can be copied to the system RAM (4), thus minimizing the access of the flash media reader and allowing for a more responsive control over the MP3 files;

4th: The file management software of the present invention sequentially delivers portions of the first music file to the CPU (6) where the decode algorithm decompresses each file using the file management software of the present invention stored in RAM (4). Once decoded, the PCM audio data is transferred in one of three ways: the CPU delivers the PCM audio data to the South Bridge (see FIG. 3 (32)) FIFO buffer; the DMA in the South Bridge transfers the data internally within the South Bridge to the FIFO buffer; or the special purpose circuit transfers the data to the FIFO buffer from the LPC interface. The FIFO buffer then sequentially feeds each piece of decoded music to Codec (8) (also see FIG. 3 (42)), through the special purpose circuit of the present invention, where the decoded signal is converted from digital to analog. Then the output signal from the Codec (8) is amplified (10) (also see FIG. 3 (44)) to drive the speakers and/or headset (see FIG. 3 (46)).

5th: While the final song of the first set from the play list is playing from memory, the file management software of the present invention stored in the RAM (4, 30) returns control to the 4th step to retrieve the next set of compressed music files from the memory of the RAM, as determined by the earlier scripted song play list developed in the 1st step. Thus, the 4th and 5th steps are repeated for each set of compressed music files until the last music selection in the set plays. At that point in time control returns to the 3rd step to load another set from the play list, which is similarly played through the 4th and 5th steps. When the last song is played from the overall play list of the 2nd step, or when the user turns off the music player function, the operation of the player ceases.

The mini-OS power saving software of the present invention ensures that the CPU, Peripheral Chips, HDD and other controllable system elements will be in idle state for the highest percentage time possible. An interesting attribute of the solution offered by the present invention is that the higher the MIPS (Million Instructions Per Second) capacity of the CPU, the smaller percentage of time the CPU will spend performing the decode function. This means that higher performance CPU's will demonstrate even lower power usage when playing compressed music performances, thus saving even more battery power and further extending the length of time that the battery maintains sufficient charge to power the portable computer.

The mini-OS monitors the audio control buttons (e.g., play, fast forward, rewind, pause, scan, previous track, next track, first track, last track, fast forward/rewind while listening, audio source/media select (e.g., HDD or CD), etc.) (see FIG. 3 (48)) for user actuation through the special purpose circuit (see FIG. 3 (40)) of the present invention, and communicates user requests to the mini-OS file management software of the present invention. Optionally, a small LCD display (see FIG. 3 (34)) can be connected to the special purpose circuit to provide visual status indicators (e.g., Song #, Song titles, track #, Playtime & icons) under control of the mini-OS display management subroutines.

The mini-OS power saving software of the present invention primarily manages the usage of the CPU, and the MP3 storage devices such as CD, HDD, and flash media such as SD (Secure Digital) cards, MMC (Multimedia Card), memory stick, and SMC (Smart Media Card), while maintaining the rest of the system, including the memory, corelogic chipsets, in a fully on and functional state. Secondary power saving is applied to other PC subsystems to minimize power usage still further by putting them in an idle state.

For example, with a 500 MHz Pentium III CPU having about 225 MIPS of processing power and the decode algorithm requiring about 15 MIPS, the CPU will be operating less than 10% of the time. The other 90-95% of the time the CPU will be in a standby mode that requires only milliamps of current. Alternatively, the CPU can be run at a slower clock speed, which is usually an option provided by most of today CPUs, such as the AMD's Athlon CPU. Similarly the HDD is accessed during the time it takes to fill or refill the RAM. Thus, since the average song takes about 4 minutes to play and the RAM holds about 30 songs for 120 Mbytes, and since the HDD needs 1-5 seconds to spin up and only several seconds to load the song play list into RAM, the total access time for the HDD may be 30 seconds out of 120 minutes of play time; a ratio of 1:240, less than 0.5% of full power operating time. These factors add to the power savings gained by using the mini-OS of the present invention instead of the full operating system of the portable computer. The result of the overall power consumption of the present invention is very low when the portable computer is in the music play mode, and that directly translates into the battery maintaining a useful charge level for a much longer time than allowed by the prior art. As those skilled in the art will recognize, the compressed music data of this invention may reside on a hard disk, on other magnetic (e.g., tape) media, optical (e.g., CD-ROM) media, flash media (e.g., SD cards, MMC, memory stick, SMC), or any other storage medium.

Figure 3:
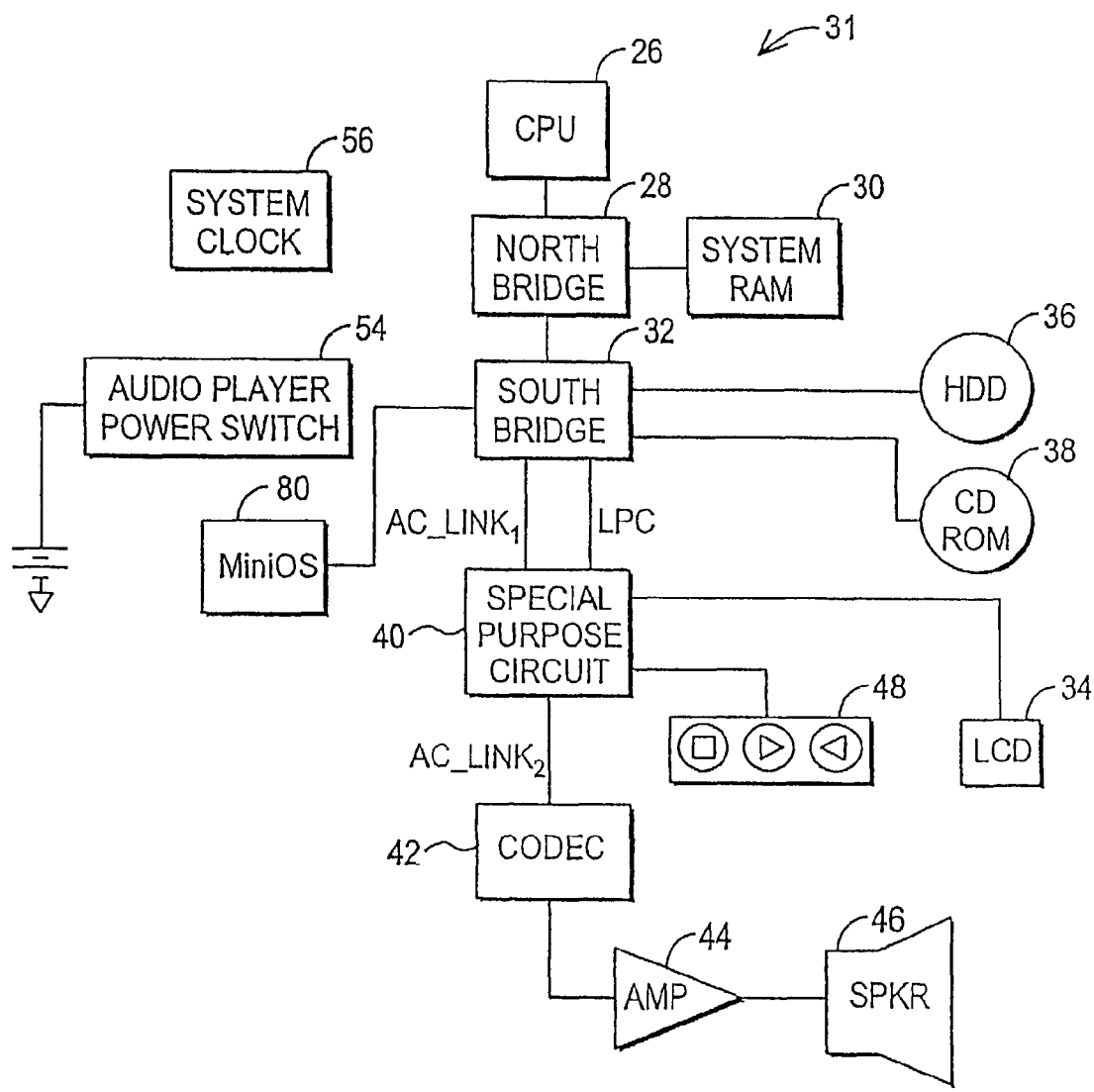
FIG. 3 is a block diagram of an exemplary audio player system consistent with one embodiment of the present invention.

FIG. 3 is a generalized overall block diagram of an exemplary system 31 consistent with one embodiment of the present invention. The majority of the blocks in system 31 are components known in the art and are generally included in all PC computers for producing sound through the speaker of the computer. Shown here is a system clock 56, which, for simplicity of FIG. 3, is not shown connected to the various components that need a clock signal. Additionally, CPU 26 is shown interfacing with North Bridge 28. In turn, North Bridge 28 interfaces with system RAM 30 and South Bridge 32. Then South Bridge 32 interfaces with HDD 36 and CD-ROM 38. Typically South Bridge 32 also interfaces directly with Codec 42 through AC_link; however, in the exemplary system 31 shown, special purpose circuit 40 (see discussion of FIG. 4 below) is inserted between South Bridge 32 and Codec 42 to enable the playing of compressed digital audio in conjunction with the mini-OS 80 of the present invention from system RAM 30, without affecting the ability to play non-compressed analog audio. In this configuration, the mini-OS 80 is stored in the BIOS, although those skilled in the art will recognize that the mini-OS could alternatively be stored in its own ROM (either within special purpose circuit 40 or external to it), a hard disk, or other media. Thus, $AC\_link_1$ from South Bridge 32 is coupled to special purpose circuit 40, which performs the decompression function as necessary, and then provides any audio signals to Codec 42 via $AC\_link_2$. Codec 42 then performs the usual function on all signals received from special purpose circuit 40 and applies the audio signals to amplifier 44, to be played on speaker 46 or headphones (not shown). In system 31, $AC\_link_1$ looks and behaves like the standard AC_link to South Bridge 32, and $AC\_link_2$ looks and behaves like the standard AC_link to Codec 42, making it appear to those portions of the computer that audio functions are being performed as during normal (i.e., known in the art) audio play, thus having minimal or no impact on the operation of South Bridge 32 and Codec 42. Also shown in FIG. 3 are function switches 48, small LCD display 34 and audio player power switch 54, which function as described hereinbelow with reference to FIG. 4.

Figure 4:
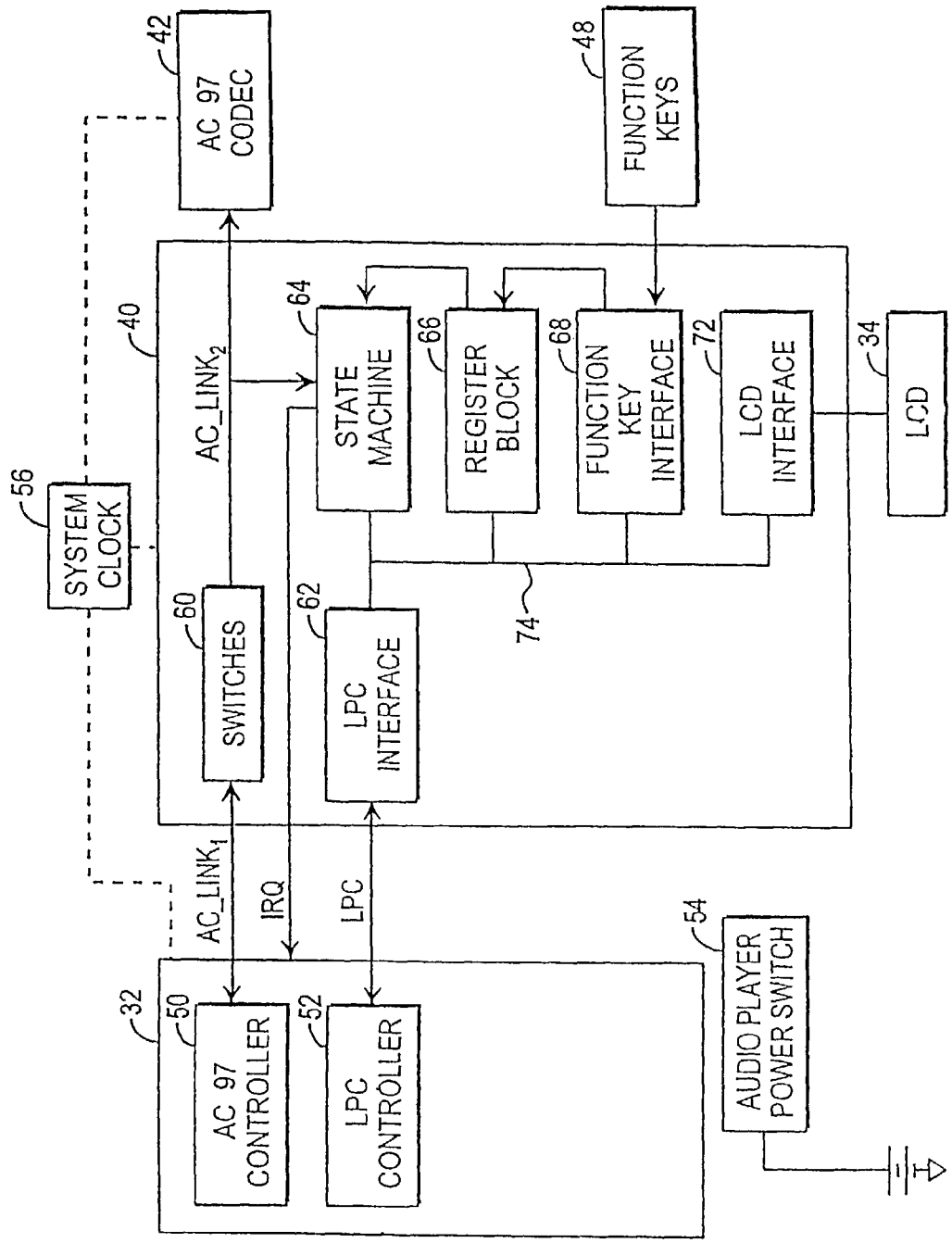
FIG. 4 is a block diagram of the internal portion of an exemplary special purpose circuit, in relation to the other components that interface with it, in one embodiment of the present invention.

FIG. 4 includes a detailed block diagram of the internals of special purpose circuit 40 and related details of the other portions of the computer that the special purpose circuit interfaces without showing all of the details of the rest of the computer system. Special purpose circuit 40 may be produced as an IC to minimize the PCB space needed to incorporate embodiments of the present invention into portable computers. South Bridge 32 is shown with the standard AC 97 controller 50 and LPC (low pin count) controller 52 to the left of special purpose circuit 40 with the standard bidirectional links $AC\_link_1$ and LPC Bus between them, and the unidirectional IRQ (Interrupt Request) link from special purpose circuit 40 to South Bridge 32. To the right, special purpose circuit 40 provides uncompressed audio to AC 97 Codec 42 via $AC\_link_2$. Also, to the right, function keys 48, and below LCD 34, are each shown connected to special purpose circuit 40. Additionally, FIG. 4 includes system clock 56 connected to various components, and in the lower left, audio player power switch 54. Power switch 54 is provided so that when the user initiates the player mode via power switch 54, only the mini-OS (instead of the full system OS) is initiated, for use in a system consistent with the present invention.

Internal to special purpose circuit 40 are switches 60 that interface with both $AC\_link_1$ and $AC\_link_2$ and function in response to settings in an internal register of register block 66, with switches 60 closed connecting $AC\_link_1$ with $AC\_link_2$ when the PC functions normally with the full system OS, and with switches 60 open when a system consistent with the present invention is employed. The LPC path is coupled to LPC interface. Switches 60 and $AC\_link_2$ are coupled to state machine 64, while another port of state machine 64 is coupled, via bus 74, to the output of LPC interface 62, as well as register block 66, function key interface 68 and LCD interface 72. A second port of register block 66 is also coupled to a third port of state machine 64. Function keys 48 are coupled to function key interface 68, and LCD 34 is coupled to LCD interface 72. Also, function key interface 68 provides a signal to register block 66 when one of the function keys 48 is selected by the user. Audio player power switch 54, which is operated by the user in the second step discussed above, may be used to activate the PC to operate as described hereinabove. Switch 54 is shown connected to the DC voltage source of the portable computer and not to any particular block in FIG. 4, since that connection varies depending on several factors controlled by the manufacturer of the computer on which an embodiment of the present invention is installed.

More specifically, the blocks within special purpose circuit 40 operate as follows:

LPC Interface

Special purpose circuit 40 includes LPC (Low Pin Count) interface 62 to interface with LPC controller 52 in South Bridge 32.

The LPC interface 62 is used to by CPU 26 to:
(1) read the function key input registers in register block 66;
(2) set the control register in register block 66 to control the AC97 Codec 42;
(3) get the audio PCM (Pulse Code Modulation) data from the system memory (RAM 30); and
(4) perform clock throttling control.

The setting in the mode register of register block 66 controls the state of switches 60 to switch the special purpose circuit 40 between the normal computer operation mode with switches 60 closed (e.g., running Microsoft Windows® OS) and the mode of a system consistent with the present invention, with switches 60 open (running the mini-OS) to play compressed audio files.

South Bridge AC97 Controller 50 Interface (AC $Link_1$ from Host)

During the normal computer operation mode, switches 60 are closed with the South Bridge AC97 Controller 50 interface connected directly through, closed switches 60, to AC97 Codec 42 to generate audio output as if special purpose circuit 40 were not present. To play compressed audio files, switches 60 are open when the mini-OS is running, and state machine 64 controls AC97 Codec 42.

AC97 Codec Interface (AC $Link_2$ to AC97 Codec 42)

When the computer is running under control of the mini-OS, switches 60 are open. State machine 64 then controls the $AC\_link_2$ in response to the settings of the register block 66 set by the host (CPU 26) to generate the controls for AC97 Codec 42 (e.g., switching the sampling frequency, controlling volume, sending the PCM data to the Codec 42, setting the Codec 42 to the power saving mode or waking Codec 42 from the power saving mode).

Function Key Input Interface 68

Function key interface 68 receives the user selections from function keys 48 and stores the selections in internal registers to be read by CPU 26.

LCD Interface 72

LCD interface 72 is only necessary if LCD 34 is used to provide status information to the user. The purpose, when used, is to show player status on low cost LCD 34 when the system consistent with the present invention is used. Status of the audio track number of the selection playing, status icons (e.g., Play) and other generic status icons may be programmed into the system and displayed for any other purpose.

Operation Modes (A) Normal Operation Mode:

When the PC is fully powered and running under the full system OS, the various functions of special purpose circuit 40 are bypassed and switches 60 are closed, as discussed above. In the normal mode, the computer system uses the South Bridge AC97 Controller 50 to directly control the AC97 Codec 42 through the AC_link (in the Normal mode AC_link$_1$ and AC_link$_2$ are the same since switches 60 are closed. The special purpose circuit does not intercept or modify the AC_link signals.

(B) Compressed Audio Performance Mode:

When switch 54 has been closed, the system runs under the control of mini-OS, and special purpose circuit 40 is empowered and runs in the compressed audio performance mode. The South Bridge AC97 Controller 50 is isolated from the AC97 Codec 42 in this mode since switches 60 are open.

In the compressed audio performance mode, the host (CPU 26) sets the internal registers of register block 66 to control the data flow to the AC97 Codec 42, and to perform the various power management functions.

A Power Saving Control Method in Compressed Audio Performance Mode

A flexible control method of the special purpose circuit 40 is provided to minimize the system control cycles and power consumption in the performance mode. The system memory (RAM 30) is used to pass most of the control commands to the special purpose circuit 40, instead of CPU 26, which minimizes the time that CPU 26 needs to access high speed external bus other than a standby level. This considerably reduces the power load on the portable computer battery in this mode.

CPU 26 also sets the system control memory registers in register block 66. State machine 64 bases operation on those register settings to obtain control words and PCM data automatically through the LPC interface 62. The control words in the system memory (RAM 30) are fetched into the internal registers, and the state machine 64 decodes the control words to determine if PCM or audio data is ready. If the audio data is ready, the state machine 64 continues to fetch the audio data and send it to the AC97 Codec 42. The control words in the system memory (RAM 30) can also be used to indicate the sampling frequency of the PCM data. So, the state machine 64 can set AC97 Codec 42 to the appropriate frequency before the PCM data is sent.

Those skilled in the art will recognize that a headphone or headset system may comprise further functionality than described hereinabove, e.g., a volume control, or the audio control buttons may be integrated thereto.

It should also be recognized that a special purpose circuit consistent with the invention may be integrated into a full-time compressed (and/or non-compressed) audio playing system capable of playing music regardless of the operation of the rest of the system. In this configuration, the special purpose circuit and mini-OS are provided, as well as a software driver for handling interrupts from the function buttons under Windows®. In this configuration, when the rest of the system is either fully on (S0) or in "sleep" (suspend to RAM or S3) mode, the system may be configured to begin execution of a custom or standard audio player, e.g., Music Match or Windows® Media Player, running under Windows®, which may be adapted to play the compressed audio files stored in the play list. In this scenario, the function buttons may be adapted for use in a passthrough-type mode using the accompanying software driver to control various features of the audio player software, e.g., Music Match, instead of controlling the special purpose circuit. When the primary operating system such as Windows® is either fully off (S5) or in "hibernate" (suspend to HDD or S4) mode, operation of the special purpose circuit may proceed to play compressed audio files from the play list as described hereinabove, wherein the function buttons control the special purpose circuit.

It is noted that the power states described above (i.e., fully on, sleep/suspend to RAM, fully off, hibernate/suspend to HDD) are often referred to using the Advanced Configuration and Power Interface ("ACPI") standard conventions, as follows: The typical operating system (e.g., Windows®) supports six system power states, referred to as S0 (fully on and operational) through S5 (power off). Each state is characterized by the following: power consumption, i.e. how much power the computer uses; software resumption, i.e, from what point the operating system restarts; hardware latency, i.e., how long it takes to return the computer to the working state; and system context, i.e. how much system context is retained, or whether the operating system must reboot to return to the working state. State S0 is the working state. States S1, S2, S3, and S4 are sleeping states, in which the computer appears off because of reduced power consumption but retains enough context to return to the working state without restarting the operating system. State S5 is the shutdown or off state. A system is waking when it is in transition from the shutdown state (S5) or any sleeping state (S1-S4) to the working state (S0), and it is going to sleep when it is in transition from the working state to any sleep state or the shutdown state, the system cannot enter one sleep state directly from another; it must always enter the working state before entering any sleep state. For example, a system cannot transition from state S2 to S4, nor from state S4 to S2. It must first return to S0, from which it can enter the next sleep state. Because a system in an intermediate sleep state has already lost some operating context, it must return to the working state to restore that context before it can make an additional state transition.

Figure 2:
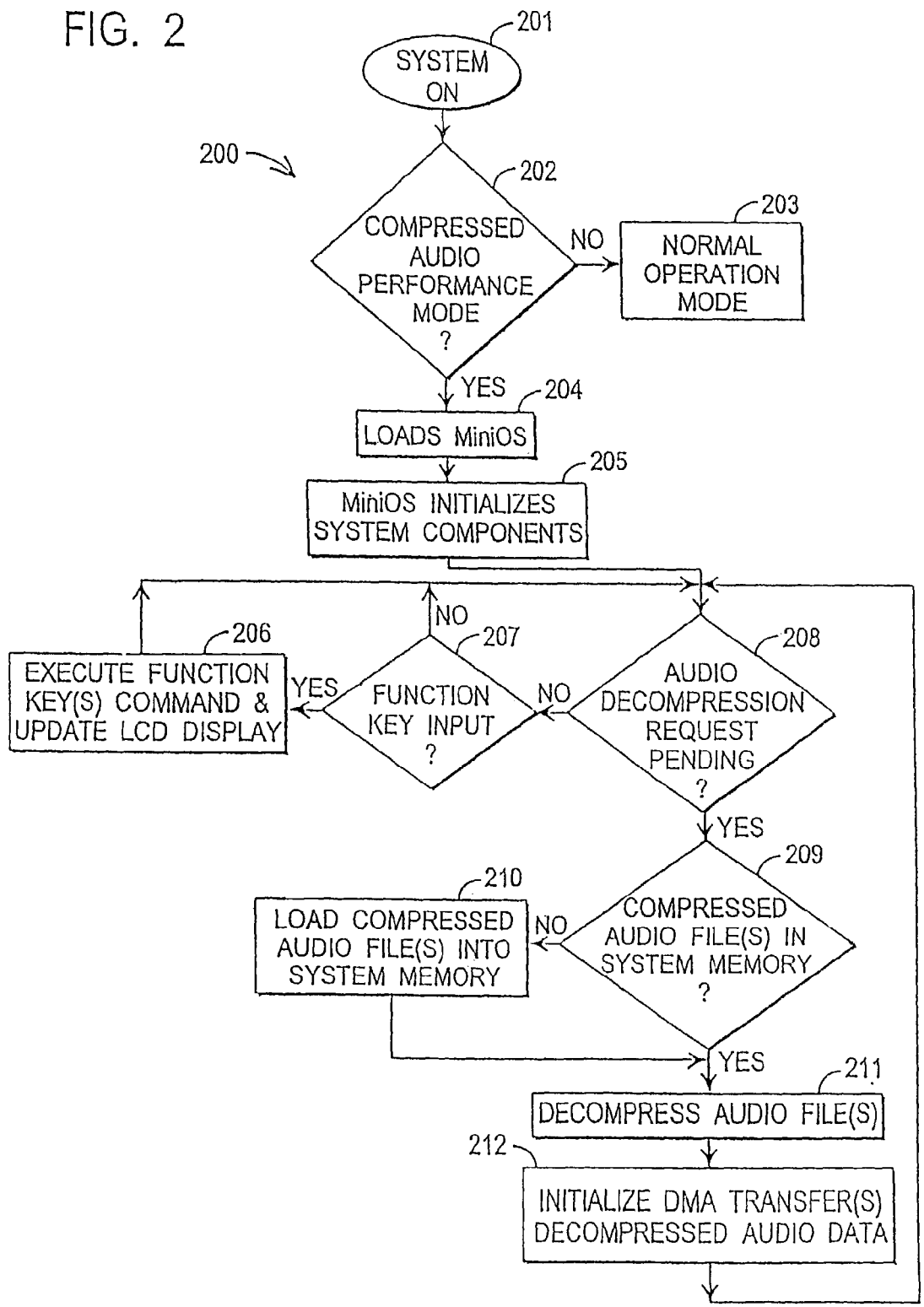
FIG. 2 is a flow diagram of an exemplary power up of the mini-OS and initiation of the player function, in one embodiment of the present invention.

Referring now to FIG. 2, in conjunction with FIG. 3, an exemplary sequence 200 for the power up of the mini-OS and initiation of the player function, in one embodiment of the present invention, is illustrated. As stated above, at some time prior to the initiation of the audio player function of a PC equipped with the present invention, the user downloads (not shown in FIG. 2) the audio files of interest to the HDD 36 or burns a CD-ROM that is placed in the CD-ROM drive 38 for use with the audio player feature of the present invention. As shown, at step 201, the sequence 200 begins when the user presses either an audio player power switch 54 or the computer's main power switch (not shown in FIG. 3), to turn the system on. A determination is then made, at step 202, whether the computer is to boot in normal operation mode or compressed audio performance mode. This determination is typically made in the BIOS, based on whether the computer's power switch or an audio player power switch 54 was used to turn on the computer, although those skilled in the art will recognize that this determination could alternatively be made by an application program or an operating system that provides such capability (e.g. Windows® 98). If the computer's power switch was used to turn on the computer, then the system boots to normal operation mode, at step 203, and the normal operating system (e.g., Windows® 98) is loaded into system RAM 30 and executed. If an audio player power switch 54 was used to turn on the computer, the mini-OS is loaded into system RAM 30, at step 204. At step 205, the mini-OS initializes the system components including one or more of the North Bridge 28, South Bridge 32, special purpose circuit 40, hard drive 36, CD-ROM drive 38, codec 42, and CPU 26.

Since no audio decompression request will be pending upon system initialization (i.e., the memory buffer is not full), which determination is made at step 208, the system waits for input from one of the function keys 48, at step 207, until one of the function keys 48 is pressed, at which point the appropriate function is executed and the LCD display updated, as appropriate, at step 206. If the command includes a request from the user to play audio, an audio decompression request will be pending at this time, which determination is made at step 208. Since no compressed audio file(s) are in system memory 30 upon the initial request to play audio, which determination is made at step 209, the compressed audio file(s) are read from the HDD 36 and/or CD-ROM drive 38 and/or portable memory media 80 and loaded into system memory 30, at step 210. After the compressed audio files are loaded into system memory at step 210, or if the audio file(s) are already in system memory, which determination is made at step 209, the audio files are then decompressed, at step 211, using the system CPU 26. DMA transfer(s) to the codec 42 are initialized for the decompressed audio data, at step 212, and then the output signal from the Codec 42 is amplified (not shown in FIG. 2) by the amplifier 44 to drive the speakers and/or headset 46. After the DMA transfer(s) are initialized, at step 212, control loops back to step 208, to determine whether an audio decompression request is pending.

Playlist Software Operation

Figure 5:
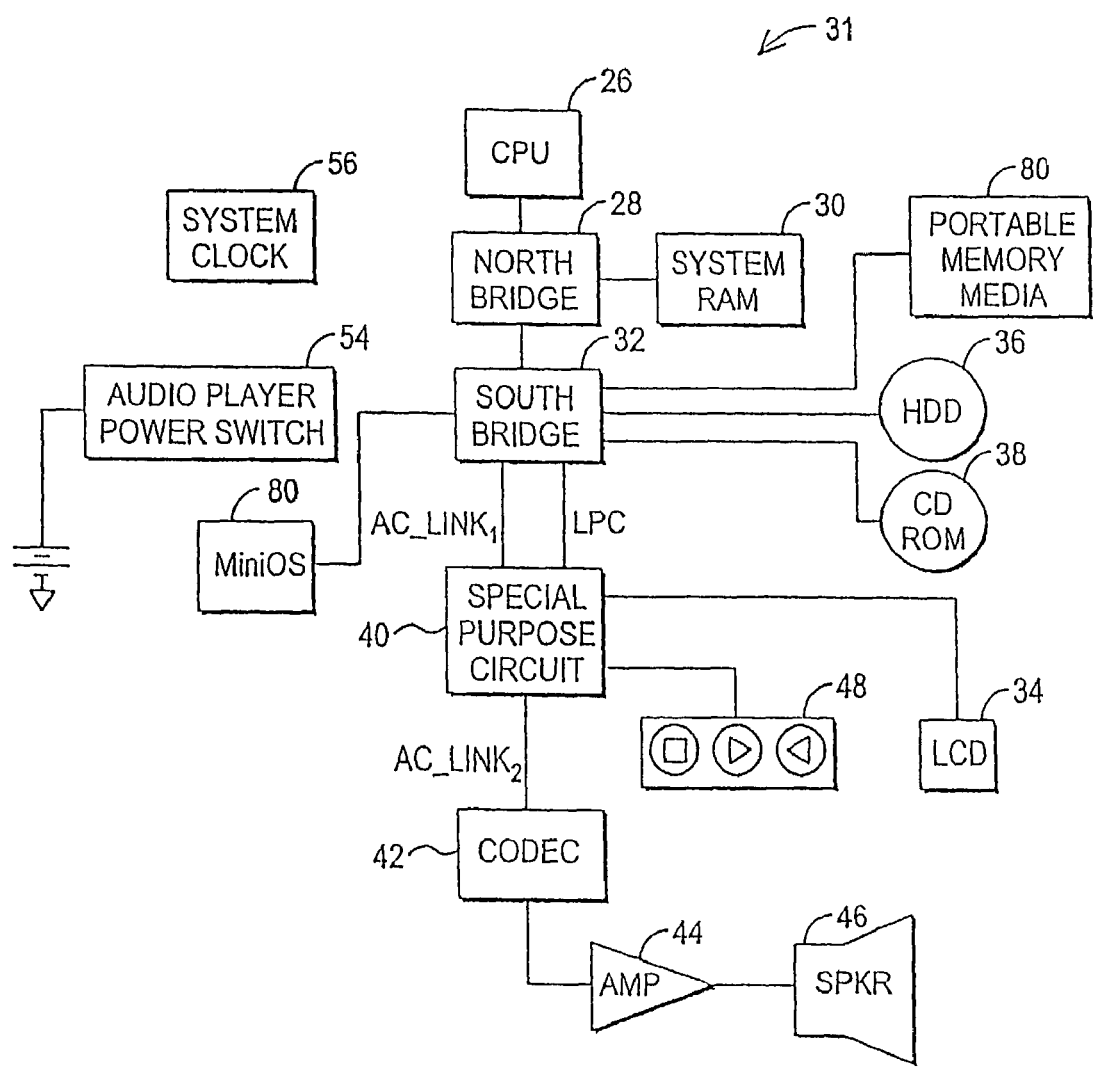
FIG. 5 is another block diagram of an exemplary audio player system consistent with another embodiment of the present invention.

FIG. 5 is another generalized overall block diagram of an exemplary system 31 consistent with another embodiment of the present invention. In this exemplary embodiment, the system 31 includes portable memory media 80 that can be used to hold the playlist data and/or compressed file data. The memory media 80 can be SmartCard media, Memory Stick media, PCMCIA memory media and/or other portable media known in the art. If the system is ON and media is detected as being present at the portable memory media location (e.g., by insertion of a Smart Card, PCMCIA, CardBus card, Memory Stick or other media into an appropriate slot), the memory reader generates an interrupt to the South Bridge 32. The special purpose circuit 40 of this embodiment also receives the interrupt and generates a command to tell the operating system to launch an appropriate application (e.g., Windows Media Player) to read the playlist data on the memory device 80. In this instance, the application takes control to read the playlist file and retrieve the audio data, either from the memory device 80 or some other location specified in the playlist file. Similarly, when the mini-OS is operational, the special purpose circuit 40 is adapted to check if a memory device 80 is present, and to scan the device for playlist data. The system then operates as described above.

The playlist file, as described herein, is a generalized data file that is constructed by a user having a desired MP3 song sequence. The playlist file also includes disk path information to instruct the application as to where to locate the desired MP3 data. Certain operating systems permit users to change drive letters on-the-fly. Accordingly, the playlist software reads the volume serial number (VSN) given by the operating system to a particular drive. The serial number does not change (unless intentionally changed by reformatting the drive), and thus, the playlist software can track the playlist data regardless if the user reassigns a particular drive letter. This feature also works similarly with switchable devices such as disk drives.

It should be recognized by those skilled in the art that, although the above-described embodiments utilize a hardware-based OS selection (i.e., pressing main power button boots to Windows®, while pressing audio control button boots to mini-OS), other OS selection methods are contemplated, as well. Such selection methods include, e.g., using a batch file or other scripting or software-based method to shut down a first OS and boot to the second OS. Those skilled in the art will also recognize that the mini-OS of the present invention could conceivably be implemented as part of a larger OS (e.g., a GUI-based OS, such as Windows®, LINUX, etc.) or as a software component named something other than an "operating system", (e.g., a "driver", an "algorithm", a "script", "code", a "program", an "executable", a "routine", a "subroutine", a "utility", etc.), instead of being implemented as an entirely separate operating system. Such embodiments are contemplated to be within the scope of the present invention.

Software Operation

Figure 6:
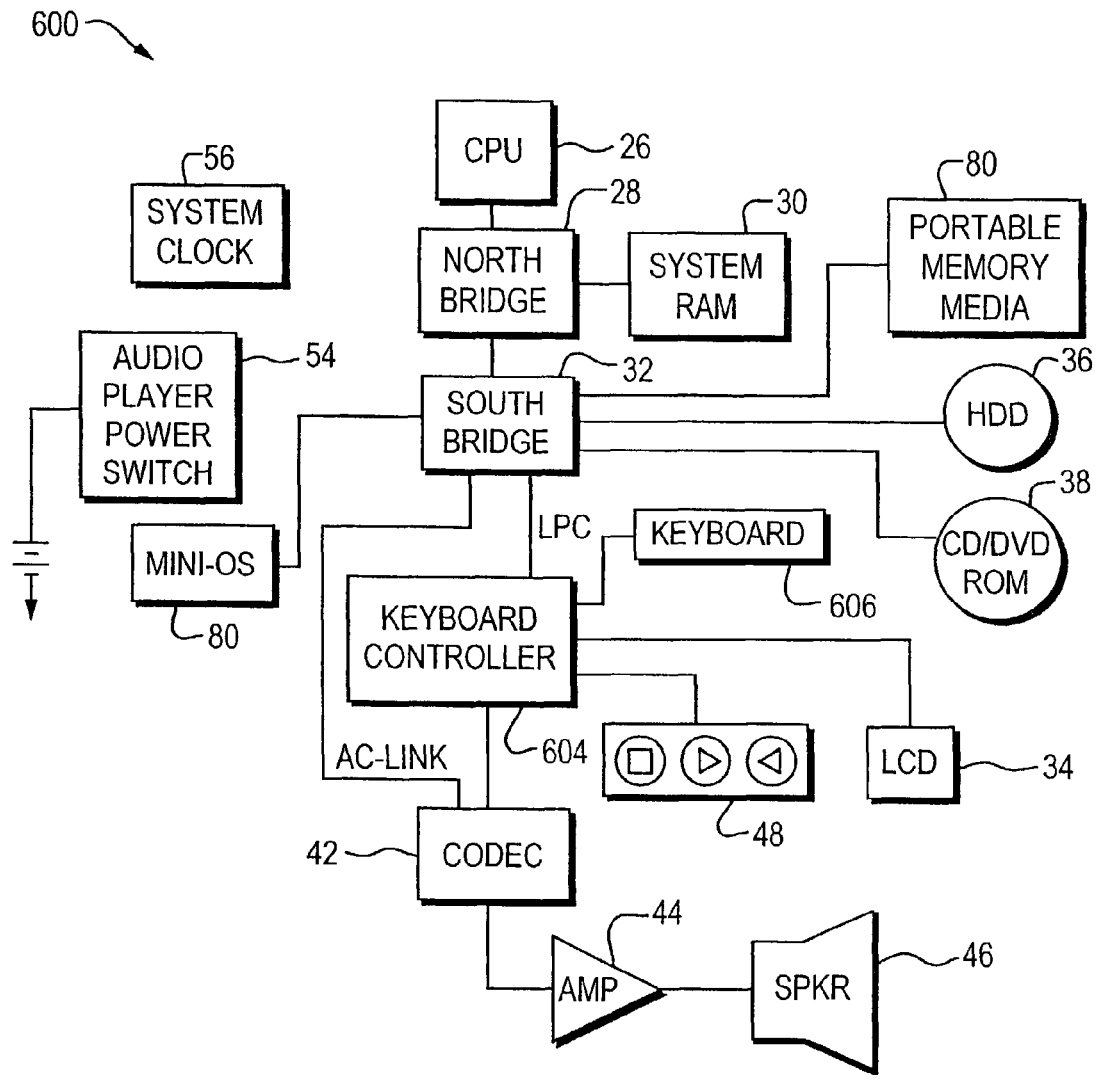
FIG. 6 is another block diagram of an exemplary audio player system consistent with another embodiment of the invention which utilizes software only for audio decoding and playing.

Turning to FIG. 6, a generalized block diagram of another exemplary computer system 600 consistent with the invention is illustrated. The computer system 600 is similar to the earlier described embodiments of FIGS. 3-5, except that the system 600 employs a purely software solution for operation of the system 600 in compressed audio mode instead of utilizing the special purpose circuit 40 (hardware) as previously described. As such, the software solution enables the system 600 to have all the functionality, including operation of a PC in compressed audio performance mode, of all the embodiments of the invention as previously described.

The computer system 600 includes all the conventional components detailed earlier with respect to FIGS. 3 and 5 and hence any repetitive description of those components and there operation is omitted herein for clarity. In addition to those earlier described components, the computer system 600 includes a conventional keyboard controller 604 adapted to interface with the audio control buttons 48, LCD 34, and the keyboard 606.

Operation of the computer system 600 in audio compressed mode is controlled by audio software adapted to be executed by a processor. As such, operation of such audio software requires the processor and a machine-readable medium. The processor, e.g., CPU 26, can be any type of processor capable of providing the speed and functionality required by embodiments of the invention. For example, the processor could be a processor from the Pentium® family of processors made by Intel Corporation.

The machine-readable media can be any type of media capable of storing instructions adapted to be executed by the processor. Some examples of such media include, but are not limited to, system RAM 30, read only memory (ROM), programmable ROM, magnetic disk (e.g., floppy disk and HDD 36), optical disk (e.g., CD/DVD ROM 38), and any other device that can store digital information. As used herein, the phrase "adapted to be executed by a processor" is meant to encompass instructions stored in compressed and/or encrypted format, as well as instructions that have to be compiled or installed by an installer before being executed by the processor. The processor and machine-readable medium may be part of a computer system 600 where various combinations of machine-readable media store combinations of the audio software which are accessible by the processor through various controllers.

The audio software provides all the functionality to load and operate the mini-OS and hence the PC system as previously detailed. Again, the mini-OS itself could be implemented as part of the larger OS or could be an "algorithm," a "script", a "code", a "program", a "routine" or a "subroutine."

Operation of the computer system 600 is detailed below with reference to the exemplary sequence 200 of FIG. 2. As earlier detailed, at some time prior to the initiation of the audio player function of a PC equipped with the present invention, the user downloads (not shown in FIG. 2) the audio files of interest to the HDD 36 or burns a CD-ROM that is placed in the CD/DVD ROM drive 38 for use with the audio player feature of the present invention. As shown, at step 201, the sequence 200 begins when the user presses either an audio player power switch 54 or the computer's main power switch, to turn the system on. A determination is then made, at step 202, whether the computer is to boot in normal operation mode or compressed audio performance mode. This determination is typically made in the BIOS, based on whether the computer's power switch or an audio player power switch 54 was used to turn on the computer, although those skilled in the art will recognize that this determination could alternatively be made by an application program or an operating system that provides such capability (e.g. Windows® 98).

If normal PC operation mode is desired, the system boots to normal operation mode at step 203, and the normal OS, e.g., Windows® 98, is loaded into system RAM 30 and executed. Just as the special circuit 40 was bypassed in such a situation, audio software consistent with the invention is not responsive to a request to operate the PC in normal operation mode.

If compressed audio mode is desired, the audio software is enabled by one of a variety of enabling techniques. For instance, the audio player power switch 54 may be utilized or a software based selection technique may be utilized. Once the audio software is enabled, it instructs the system to load the mini-OS in system RAM 30 at step 204. Advantageously, the boot up time of the PC utilizing the mini-OS to boot up in a compressed audio mode is faster than the boot up time of the PC utilizing a traditional OS to boot up in normal PC mode. In this way, a user can quickly listen to a variety of audio files without waiting for the longer boot up time of the PC in normal PC mode.

Then at step 205, the mini-OS initializes the system 600 components including one or more of the North Bridge 28, South Bridge 32, hard drive 36, CD/DVD-ROM drive 38, codec 42, and CPU 26. In addition, the CPU 26 utilizes the audio software to control data flow to the Codec 42 and to perform the various power management functions earlier detailed.

Since no audio decompression request will be pending upon system initialization (i.e., the memory buffer is not full), which determination is made at step 208, the system waits for input from one of the function keys 48, at step 207, until one of the function keys 48 is activated. At this time, the appropriate function is executed and the LCD display 34 may be updated, as appropriate, at step 206. If the command includes a request from the user to play audio, an audio decompression request will be pending at this time, which determination is made at step 208.

Since no compressed audio file(s) are usually in system memory 30 upon the initial request to play audio, which determination is made at step 209, the compressed audio file(s) are read from the HDD 36 and/or the CD/DVD ROM drive 38 and/or the portable memory media 80 and loaded into system memory 30, at step 210. For instance, the compressed audio files could be on a CD or DVD as read by the CD/DVD ROM drive 38. After the compressed audio files are loaded into system memory at step 210, or if the audio file(s) are already in system memory, which determination is made at step 209, the audio files are then decompressed, at step 211, using the system CPU 26.

DMA transfer(s) to the codec 42 are initialized for the decompressed audio data, at step 212, and then the output signal from the Codec 42 is amplified (not shown in FIG. 2) by the amplifier 44 to drive the speakers and/or headset 46. After the DMA transfer(s) are initialized, at step 212, control loops back to step 208, to determine whether an audio decompression request is pending.

Applications

Figure 7:
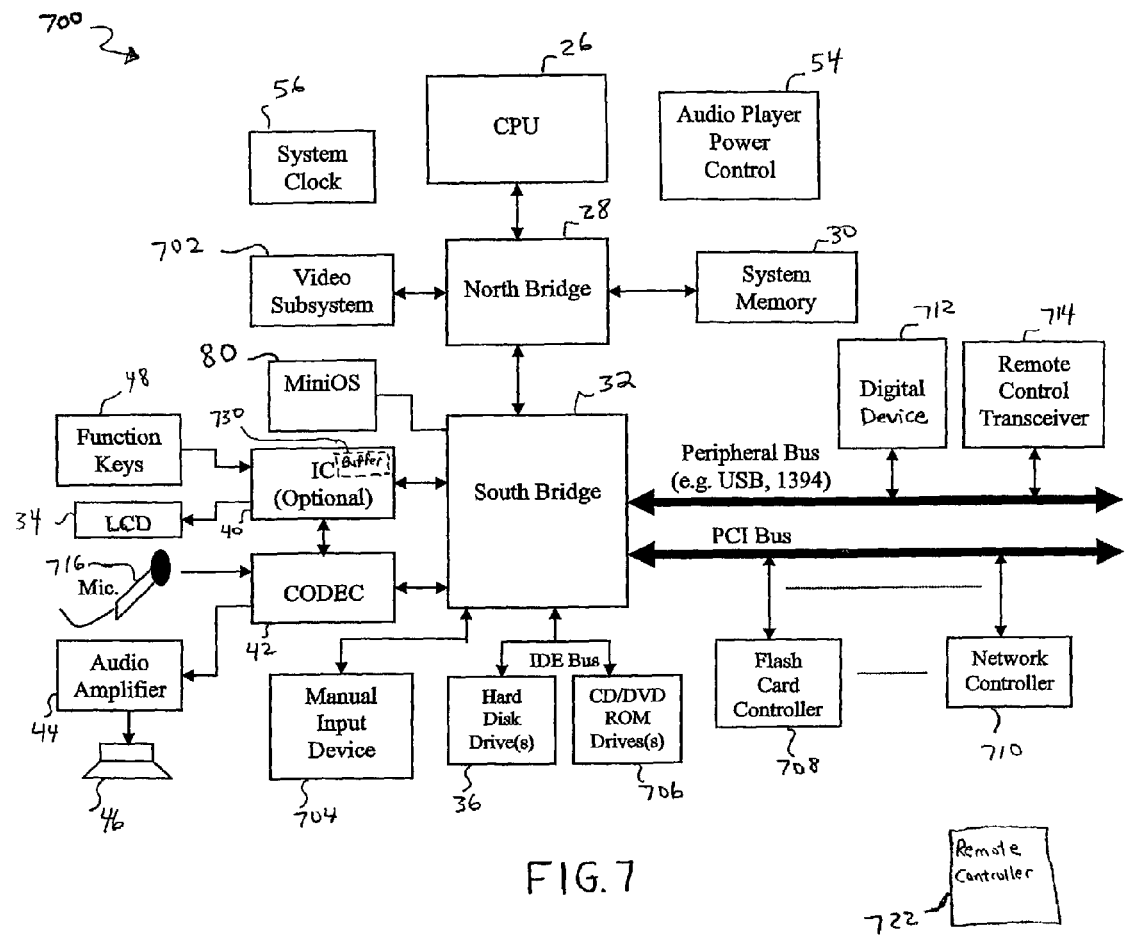
FIG. 7 is another block diagram of a computer system consistent with the invention to illustrate various applications that may be run by a computer system in compressed audio mode.

Those skilled in the art will recognize a variety of software applications that may be utilized in the compressed audio mode that provide improvements found over that found in traditional computer systems and PCs. Several such applications include: 1) media selection; 2) voice recording; 3) taking and storing digital images; and 4) remote control applications. Each of these is addressed in more detail below with reference to the block diagram of the computer system 700 of FIG. 7. Each application may operate with software only and in some instances may operate in conjunction with the special purpose circuit IC 40 to provide enhanced power management capabilities. The computer system 700 includes many components detailed earlier with respect to FIGS. 3, 5, and 6 where similar components are labeled similarly and hence any repetitive description of those components is omitted herein for clarity. The exemplary list of four applications is not exclusive and those skilled in the art will recognize a variety of other applications where operation of a computer system in the audio compression mode provides improvements over that found in traditional computer systems.

Media Selection

A plurality of compressed audio files may be stored in a variety of media of the computer system 700. Such media includes the HDD 36, a CD/DVD disk, a flash media card, etc. Such files may number into the thousands and hence such files are also typically organized in a directory structure, e.g., by song type, artist, album, etc. Advantageously, media selection software, which may be part of the mini-OS 80, is responsive to at least one function key to enable a user to search, access, and select an audio file or directory from the various media.

Typical function keys 48 may include a stop, play, pause, fast forward, rewind, and volume up and down keys. Typically, these function keys act independently to enable a user to select only one desired action. The media selection software consistent with the invention enables a user to first activate a combination or sequence of function keys to enter a directory mode. The directory mode enables a user to access various audio files and directories and enables the user to search, select, and store various audio files using at least one function key 48. Once an audio file is found or stored a user may exit the directory mode by again using at least one function key.

A variety of function keys, combinations, or sequences of such function keys may be utilized to enter, navigate, and exit the directory mode. For instance, one function key, e.g., the "stop" function key, may be used to enter the directory mode while music playback is stopped. Alternately, two or more function keys, e.g., the volume up and volume down function keys, may be activated simultaneously to enter the directory mode. Once the directory mode is entered, one or more function keys may enable a user to navigate the various audio files in various directories of various media. Such navigation may enable a user to search, select, and store audio files. For instance, the fast forward and rewind keys may be used to search or scroll through various audio files and directories. The volume up and volume down, or any other set of function keys, may also be utilized in this instance. In addition, an LCD display 34 may also be utilized in order to display directory information to enable users to search various directories more readily. Finally, a user may utilize one or more function keys to exit the directory mode. For instance, pressing the stop key may exit the directory mode. Once this mode is exited, a user may press the play function key to play a selected audio file.

Voice Recording Application

Voice recording software applications can be quickly provided when the computer system 700 is operating the mini-OS 80 in the compressed audio mode. In operation, a user of the computer system 700 may select a voice recording mode. The mini-OS 80 then enables the user to utilize an audio input device, e.g., microphone 716, to input analog voice data. An analog to digital converter in the codec 42 then converts the input analog voice data signal to a digital audio signal. The IC 40 or South Bridge 32 is programmed to receive the digital audio input signals from the codec 42 and send it to system memory 30, e.g., system RAM, by using master or DMA cycles.

The CPU 26 may then retrieve the voice data from system memory 30 and utilize a variety of voice coding techniques known to those skilled in the art to perform voice data compression. After compression, the smaller voice files may then be sent to a mass storage device, e.g., hard disk drive 36, of the computer system 700 or it may be sent to a flash media card. If the voice file is stored in a flash memory card, it could be removed and put into any other computer system or compressed audio player which has a compatible flash card interface.

The voice recording software application may utilize the IC 40 and mini-OS 80 or may utilize only the mini-OS 80 without any IC 40. For the IC 40 and mini-OS 80 solution, the IC 80 may be utilized to keep the CPU 26 in low power states for the majority of time during a voice recording application. The IC 40 operates as previously described, e.g., with reference to compressed audio performance operation mode including the power saving control method in compressed audio performance mode. As such, the IC 40 enables power savings for the computer system 700 by enabling the CPU 26 to be put into lower power states while it is not performing particular functions such as compression of voice data. For instance, the CPU 26 could be maintained in a low power state when voice data is being transferred from the codec 42 to the system memory 30. Since the voice recording software and compression software need generally little CPU 26 time, the CPU 26 can advantageously be placed in a low power state for a significant amount of time. The IC 40 may also be used to wake up the CPU 26 periodically.

The IC 40 may additionally be equipped with a buffer 730, e.g., a first-in first-out (FIFO) buffer, to enable the CPU 26 to enter even deeper sleep modes for additional power savings. For instance, the CPU has a plurality of power states while the computer system 700 is in a working state. One such state is a full power state. In this state, the CPU consumes the most power relative to any other of several sleep states. The CPU may also have a plurality of sleep states such as a light sleep state and a deep sleep state, where the CPU consumes less power in the deep sleep state that in the light sleep state. The light sleep state may be further divided into a first light sleep state and a second light sleep state, wherein the CPU consumes less power in the second light sleep state than in the first light sleep state.

In one embodiment, the CPU's full power state may be state C0, the first light sleep state may be state C1, the second light sleep state may be state C2, and the deep sleep state may be state C3 as those states are defined by the ACPI Specification. Those skilled in the art will recognize that the CPU consumes less power in each successive sleep state C1, C2, C3 compared to the preceding state. However, the power consumption difference between each state depends on the system particulars.

Advantageously, the buffer 730 of the IC 40 enables the CPU 26 to enter a deep sleep state such as state C3. Without the buffer, the CPU 26 can at most enter state C2 in the voice recording application. The buffer 730 is configured to store voice data. When the buffer 730 reaches a predetermined low data condition, the IC 40 generates a deep sleep signal to the CPU 26 instructing the CPU 26 to enter a deep sleep state such as state C3. On the other hand, if the voice data in the buffer reaches a predetermined full data condition, the IC 40 generates a wake up signal to the CPU 26 enabling the CPU to perform voice compression. Those skilled in the art will appreciate that the buffer 730 has internal registers that may be programmed to provide the deep sleep signal and wake up signal depending on the volume of data in the buffer.

As an alternative, a mini-OS software only approach can be utilized to perform a similar voice recording application function without using the IC 40. A software only approach for operation of the computer system 600 in compressed audio mode was previously described with reference to FIG. 6. In this voice recording application instance, operation of the computer system 700 would consume more power than the mini-OS 80 and IC 40 solution previously detailed because the CPU 26 could be placed in at most state C2 rather than state C3. In some instances where power consumption is less of a concern, e.g., desktop computer system, a pure software approach with the mini-OS 80 only is an attractive approach since it is less expensive than the mini-OS 80 and IC 40 option earlier detailed.

Taking and Storing Digital Images

A variety of digital devices such as digital cameras, digital video recorders, or the like are external devices that take and store digital images on a variety of storage devices such as flash media cards. Some types of flash media cards include SmartMedia™, CompactFlash™, and Memory Stick® cards. Some of these digital devices 712, e.g., a digital camera or video recorder, may also be internal to, or integrated with, the computer system 700.

For such digital devices, operation of a computer system 700 in compressed audio mode provides users with a way to take and store digital images without waiting for a long boot up time of a normal OS and while providing added power management capabilities. For taking digital images with a digital device 712 that is internal or a built-in digital device, a user may first boot up the computer system 700 in audio compression mode rather than a normal operation mode. Associated digital device software may then prompt a user to select a digital device mode and enable the user to utilize the function keys 48 to instruct the digital device 712 to obtain digital data. For instance, the digital device 712 may be a digital camera that takes a digital picture image or a digital recorder that takes digital video. The digital image may then be displayed on a video display screen of the computer system 700 and/or such digital images may be stored on a mass storage medium, e.g., HDD 36, of the computer system 700. The internal or external digital device may be connected to the computer system 700 through a peripheral bus such as USB or IEEE 1394.

If the digital device 712 is external to the computer system 700, a user can utilize associated digital device software to import digital data from the digital device 712 and store such data on a mass storage device, e.g., the HDD 36. As such, the digital device software application provides a simple and easy interface for users to import digital data without waiting for a long boot up time for a normal OS. For example, if the digital device 712 is a digital camera external to the computer system 700, the digital device software permits a user to download digital images to a mass storage medium of the computer system 700.

Similar to the voice recording application earlier detailed, the digital camera application may be implemented by either a mini-OS 80 and IC 40 solution or a software only mini-OS 80 solution. If the digital device 712 is an internal device such as an internal digital camera, the min-OS 80 and IC 40 solution can provide a power management function that enables the CPU to be in a deep sleep power state such as state C3 until a picture is actually taken.

As an alternative, a mini-OS software only approach can be utilized to perform a similar digital taking or storing function without using the IC 40. As with the voice recording application, the computer system 700 would consume more power in this instance because at most the CPU 26 could be placed in state C2. In some instances where power consumption is less of a concern, e.g., desktop computer system, a pure software approach with the mini-OS 80 only is an attractive approach since it is less expensive than the mini-OS 80 and IC 40 option earlier detailed.

Remote Control Application

While the computer system 700 is operating in compressed audio mode, remote control applications can be provided to essentially replace the function keys 48 and allow a user to remotely control several operations of the computer system 700. A remote controller 722 provides control signals to the remote control transceiver 714 of the computer system 700. The remote controller 722 could utilize any known type of control technologies such as Infrared or radio frequency (RF). The remote control transceiver 714, which may be integrated into the system bridge, receives control signals from the remote controller 722. Although not illustrated as such, the remote control transceiver 714 may also be integrated with the IC 40. The transceiver 714 is powered even when the computer system 700 is off.

In operation, a user may utilize the remote controller 722 to activate a compressed audio button. An appropriate control signal is then sent to the remote control transceiver 714. If the computer system 700 is initially off, the transceiver 714 sends a wake up signal to turn the computer system 700 on. The computer system 700 will check the transceiver at this point to see if the received control signal indicates that operation in compressed audio mode is desired. If it is, the mini-OS will be loaded into system memory and operation in compressed audio mode will begin as earlier detailed with reference to activation of the audio player power switch 54.

As such, a user of the computer system 700 can access available functions and applications available in compressed audio mode via the remote controller 722 without having to physically activate appropriate keys, e.g., function keys 48, of the computer system. The same remote controller 722 may also have a normal power on button to enable powering up of the computer system 700 in normal operation mode where the normal OS would be loaded into system memory. As such, the remote controller 722 may also be used to control other functions in normal operation mode.

Entertainment Mode

In addition to compressed audio mode operation, PCs are constantly being upgraded to include a host of entertainment applications not typically associated with traditional PC computing applications. For instance, such entertainment applications include, but are not limited to, both audio playback applications including Internet radio and compressed audio playback, DVD movie playback applications, TV viewing applications, digital device applications, remote control applications, voice recording applications, etc. Just as selection of compressed audio mode for quick access to audio playback and other applications is advantageous, so would selection of an entertainment mode for quick access to entertainment applications offered by the PC. As such, a user of a PC could make a selection for operation of the PC in PC mode or in entertainment mode. Such selection could be hardware based, e.g., activation of a particular entertainment button, or software based, e.g., via a selection menu. If a PC mode were selected, a typical boot sequence and loading of a primary operating system, e.g., Windows, would result. If the Entertainment mode was selected, a boot sequence and loading of an alternate operating system, e.g., the mini-OS would result. As earlier detailed, the mini-OS could be implemented as part of the larger OS, e.g., the mini-OS could include those portions of the larger OS necessary for operation of the entertainment applications. As such, the mini-OS could be a subset of the larger OS. The boot sequence for loading of the mini-OS may be a quick boot sequence as detailed herein to enable a user to gain quick access to entertainment applications.

Quick Boot

Figure 8:
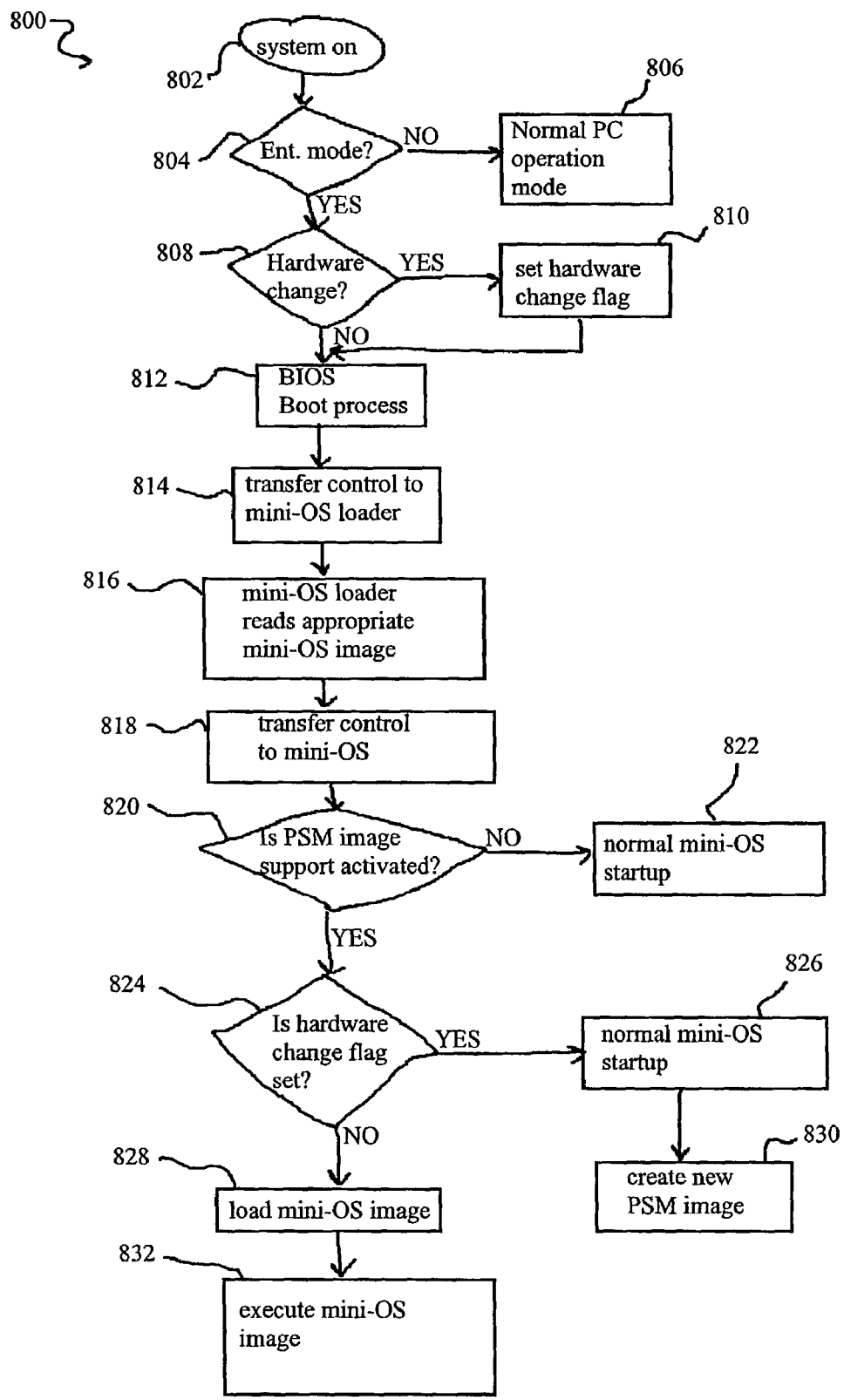
FIG. 8 is a flow chart of an exemplary power up of a computer system in entertainment mode and an associated quick boot process.

Turning to FIG. 8, an exemplary flow chart 800 of a quick boot process is illustrated. The quick boot process is described herein with reference to booting of a mini-OS for use when the PC is operated in entertainment mode. Those skilled in the art that the quick boot process consistent with the invention could also be applied to speed up the boot process of other operation systems, e.g., the primary operating system, as well. The quick boot process for the min-OS starts when the PC is turned on at step 802. A determination is made at step 804 as to whether operation in the entertainment mode is desired. This determination may be made in the BIOS depending, for example, on whether the PC main power switch or an entertainment mode switch was used to turn on the PC. As previously detailed, such a selection could also be software based. If normal PC operation mode is desired, the system boots to normal operation at step 806 and the normal OS, e.g., Windows®, is loaded into system RAM and executed.

If entertainment mode is desired, a determination is made if any hardware has changed from the previous entertainment boot in step 808. This determination is typically made by the BIOS. If some hardware has changed, a hardware change flag may then be set 810. If the hardware has not changed, then no flag is set. Next, a BIOS boot process 812 is performed. This may be a typical BIOS boot process or an accelerated BIOS boot process as later detailed herein with reference to FIG. 9. After the BIOS boot process 812, control is transferred to a mini-OS loader 814. The mini-OS loader will then read the appropriate mini-OS image 816. The mini-OS may by part of the primary operating system file or it may be located in some memory storage device. It may also be in stored in a compressed format and, if so, the mini-OS loader would decompress the compressed format. At this point, control is then transferred to the mini-OS 818.

Once control is transferred to the mini-OS 818, it is determined if a Preconfigured Application Suite & Mini-OS Memory Image (PSM image) support function is activated 820. If such PSM image support is not activated, then normal mini-OS startup would occur 822. Normal mini-OS startup includes selecting and loading various software modules that could be utilized while the PC is operating in the Entertainment mode.

If PSM image support is activated, it is then determined if the hardware change flag has been set 824. If the flag has been set indicating that the hardware configuration has changed since the last Entertainment boot, then normal mini-OS startup would occur 826. This normal mini-OS startup process would include performing mini-OS software module and application loading processes based on the new hardware configuration. In addition, since PSM support is activated in this instance, a new PSM image file is created 830. Such a PSM image file may then be utilized in subsequent Entertainment mode boot sequences.

If the hardware change flag is not set indicating that the hardware configuration has not changed from the previous Entertainment mode boot sequence, then an appropriate PSM image file is immediately loaded 828 and executed 832. In this instance, the appropriate image file is the image file created on the previous entertainment mode boot.

In addition, a variety of PSM image files may be loaded depending on the circumstances. Again, such a PSM image file may typically be that of a previous boot in Entertainment mode where the hardware is unchanged from the previous boot. Another PSM image file may be based on the particular hardware present. A boot time mechanism should be provided in order to select which PSM image file to load 828. As such, the mini-OS startup is accelerated if the loaded configuration is captured in such a PSM image file. In an ideal case, the PSM image of a specific mini-OS and preloaded application suite can be captured immediately after start up using a suspend/resume like mechanism to allow fast restoration to a known PSM image configuration.

The PSM image file may typically include a "fingerprint" identifying the supported hardware configuration, a "splash screen" including the display contents at the time of the PSM image capture, and a memory image of that part of the memory in use by the mini-OS and the PSM image file at the time of the PSM image capture.

In addition, if the mini-OS is scaled down version of the primary OS or a subset of the primary operating system, the boot process can be sped up even more by automatically unloading software modules that would not be required for entertainment mode when the computer system operating the with the primary operating system is shut down. Therefore, when the computer system is started up again in entertainment mode, the mini-OS as a scaled down version of the primary operating system will be able to be booted up much more quickly.

Figure 9:
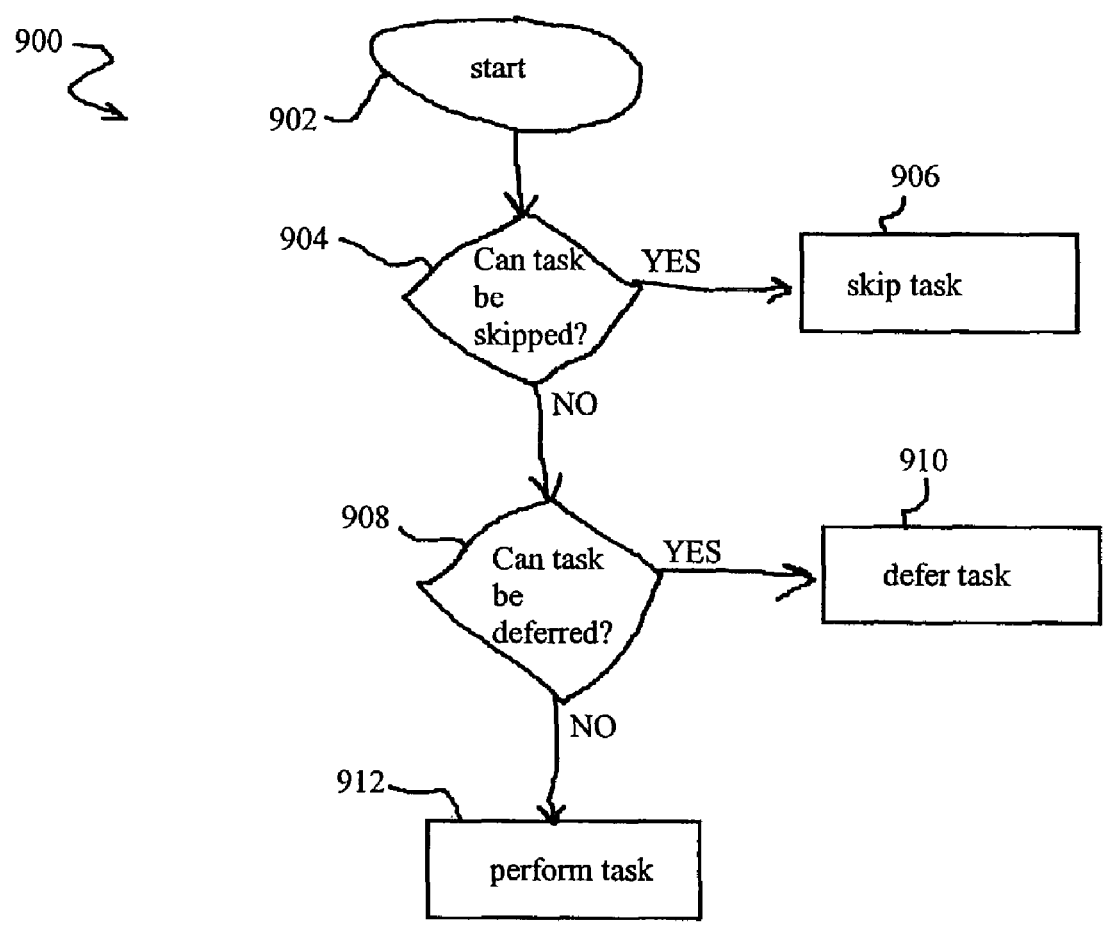
FIG. 9 is a flow chart of an exemplary accelerated BIOS boot process that may be utilized as the BIOS boot process of FIG. 8.

Turning to FIG. 9, a flow chart 900 illustrating an accelerated BIOS boot process is illustrated. The accelerated BIOS boot process may be utilized as the BIOS boot process 812 of FIG. 8. The accelerated BIOS boot process may also be utilized with the primary OS when normal PC operation mode is desired. When utilized in the Entertainment mode, the accelerated BIOS boot process starts 902 once the Entertainment operation mode has been selected. The BIOS determines if any tasks of the typical BIOS operation can be skipped 904. If any tasks can be skipped, then such tasks are skipped 906 thus saving the time to perform such tasks. For instance, all hardware check for devices not necessary for Entertainment mode can be skipped. Any hardware checks for hardware required for mini-OS startup should typically not be skipped. Memory test tasks may also be skipped.

If tasks cannot be skipped, the accelerated boot process determines if such tasks may be deferred or delayed 908. If such task can be deferred until a later time, then such task is deferred 910. For instance, such a task that may be deferred includes deferring reading data from a disk after the disk is spun up. Any other tasks, where practical, should also be deferred. Such tasks can be deferred to a later time after the mini-OS has been properly loaded.

Parental Control

A computer system operating in normal PC mode or in entertainment mode may enable a user to have access to a variety of entertainment applications, e.g., DVD movie playback, TV, audio applications, etc. Such a computer system may also be utilized by children of various ages. Parents or other caretakers of such children may wish to control the content of various entertainment applications as well as the time such applications are available. In addition, parents may also wish to allow different children of differing ages or maturity levels access to different content, e.g., it may be desirable to allow one child access to only General Audience "G" rated movies while allowing another access to Parental Guidance Suggested "PG" rated movies, as well as track activity of children while using such entertainment applications.

Figure 10:
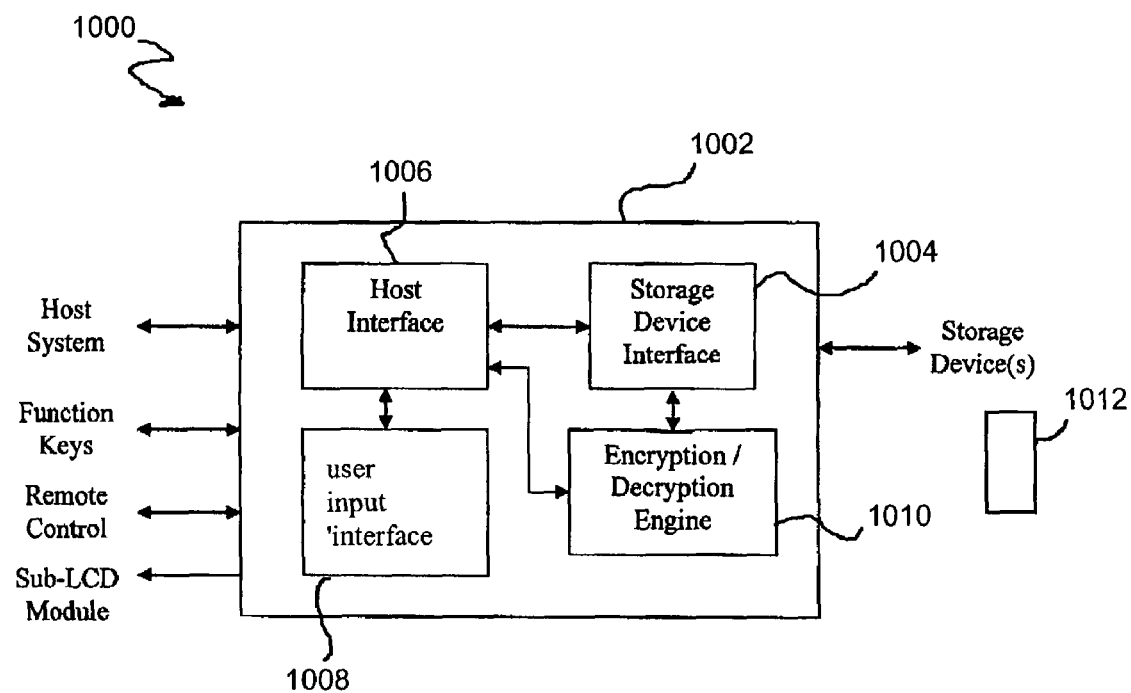
FIG. 10 is a block diagram of a parental control system consistent with another embodiment of the present invention.

Turning to FIG. 10, a block diagram of a parental control system 1000 consistent with the invention including a parental control integrated circuit (IC) 1002 and external storage device 1012 to provide such parental control functionality is illustrated. The IC 1002 may be part of a computer system having other components known in the art. In general, the parental control IC 1002 cooperates with the external storage device 1012 to provide such parental control functions. The external storage device 1012 may contain encrypted data particular to an individual child or class of children. The external storage device 1012 may be any variety of devices for storing data. For instance, the storage device may be a smart card, SD card, memory stick, compact flash card, etc. The IC 1002 may be an individual IC or it may be integrated with other ICs in the computer system such as the CardBus controller or flash card reader to name just a couple. As such, integration with another IC typically reduces system cost and board size.

Upon operation of the computer system in normal mode or entertainment mode, a user (e.g., a child) inserts their associated storage device 1012 into the appropriate slot in the computer system. In general, the IC 1002 acts as an interface between the storage device 1012 and the host system to allow secure communication between the host system and the storage device as further detailed herein. The IC 1002 permits data on the storage device 1012 to be properly read by the host system, such that the appropriate operating system of the host computer system, e.g., the mini-OS if operating in entertainment mode, can control the playback of various files of various entertainment applications according to the instructional data on the storage device 1012. As such, the IC 1002 receives a first coded signal from the storage device 1012 and provides a second decoded signal to the host computer system that is understandable to the host computer system.

In general, the parental control IC 1002 includes a storage device interface 1004, a host interface 1006, a user control interface 1008, and an engine 1010, e.g., an encryption/decryption engine. The storage device interface 1004 provides a communication channel between the IC 1002 and the external storage device 1012. Similarly, the host interface 1006 permits communication between the IC 1002 and the host computer system. Communication between the IC and the host computer system may occur via any standard bus interface known in the art such as PCI, USB, I2C, SMBus, etc. The user input interface 1008 allows communication of user commands to the host interface 1006. For instance, user commands may be entered via function keys, e.g., function keys 48, or via a remote controller, e.g., remote controller 722 when the user is operating the computer system in entertainment mode. User commands may also be entered via a keyboard or mouse. Once a user inputs a desired command, the user input interface 1008 interprets such commands and provides associated commands to the host interface 1006. The associated commands may then be provided to the host computer system via the host interface 1006. The appropriate operating system will evaluate user commands relative to signals received from the storage device 1012 to determine if user commands are appropriate. For instance, a mini-OS in entertainment mode would deny a user request to watch a Restricted rated ("R") DVD movie if instructional data in the storage device 1012 indicated such content is not permitted for that particular user.

The engine 1010 of the parental control IC 1002 provides for secure communication between the storage device 1012 and the host system. Data may be stored on the storage device 1012 in a coded format, e.g., in an encrypted format, such that the storage device 1012 may only be read by an associated parental control IC 1002. As such, when the host computer system needs to read data from the storage device 1012, the decryption portion of the engine 1010 provides this function. On the other hand, when the host computer system needs to write data to the storage device 1012, e.g., to create or change parental control data, the encryption portion of the engine 1010 provides this function. The engine 1010 can be implemented in hardware, software, or some combination thereof. In hardware, the engine 1010 could be implemented with a microprocessor or with hardwire logic as is known in the art.

In order to recover the contents of the instructional data located on the storage device 1012 which may be provided to the IC 1002 as a first coded signal, a correct decryption key is required by the decryption part of the engine 1010. The key is an algorithm that essentially "decodes" the work of the encryption algorithm. The key may also be used to make sure only appropriate storage devices 1012 are used with the computer system. For instance, a storage device created by an unauthorized user or machine should not be able to be read by the key of the decryption engine. If no valid external storage device is found, the appropriate operating system, e.g., the mini-OS in Entertainment mode, may still allow a basic or general level of entertainment applications to be accessed and played.

The storage device 1012 may be programmed to include instructional data for a particular child. Alternatively, the storage device may be preprogrammed ahead of time such that a parent may have a programmed storage device 1012 immediately available to them upon purchase of the computer system without having to program their own storage device. Such a preprogrammed storage device may be for a particular class of child, e.g., children between the ages of 8 and 10.

Regardless of who programs the storage device, it may contain instructional data so that when the storage device is used in conjunction with the parental control IC 1002, parents can regulate content, total viewing time, and time-of-day viewing for various entertainment applications and even keep track of a child's use of the computer system. To control content, the storage device 1012 may be programmed such that when used in conjunction with the parental control IC 1002, the parental control system 1000 will not allow certain files to be viewed or listened to that have an unacceptable rating for the particular child despite user instructions to the contrary.

For instance, the storage device 1012 may be programmed to specify only movies having a PG or G rating should be viewable. Similarly, the storage device 1012 may be programmed to specify that playing of any TV shows rated for adult content or playing any audio files rated for adult content should not be permitted by the computer system. In operation, a child would insert their associated storage device 1012 into the appropriate slot in the computer system. If the child were operating the computer system in entertainment mode, the instructional data from the storage device indicating the appropriate ratings for the various entertainment options would be provided as a first coded signal to the IC 1002. The storage device interface 1004 would then provide a coded input signal to the engine 1010 representative of the first coded signal.

In this instance, the engine 1010 would act as a decryption engine to convert the input coded signal into an output decoded signal. The host interface accepts the output decoded signal from the engine 1010 and provides a second decoded signal to the host system, e.g., the mini-OS when operating in entertainment mode, which is readable by the host system. Based on the second decoded signal which is representative of the instructional data on the storage device 1012, the mini-OS would control the various entertainment options. For instance, the mini-OS would not play an R-rated movie despite a child's command via the function keys or a remote controller to play such a movie if the second decoded signal indicated the instructional data on the storage device 1012 prohibits the playing of such movies.

In addition to be controlling content, the parental control system 1000 may include a storage device 1012 programmed to limit access time to entertainment options to a defined time limit during a predetermined time interval. For instance, the storage device 1012 may be programmed to limit entertainment applications to two hours per day. As the child inserts their associated storage device into the appropriate slot of the computer system, the parental control IC 1002 communicates instructions to the appropriate OS about the time limit data on the storage device 1012. As such, the appropriate OS notes the start time of such entertainment application activity by comparison to its internal clock and may then start an internal count. This may be accomplished any variety of ways known in the art including the use of a PLL timer that is clocked by a set crystal. Once the internal count reaches the predetermined limit, the appropriate OS shuts down all entertainment applications for that particular child. As such, the parental control system 1000 allows a parent to limit the amount of time a child (including different time intervals for different children) has access to various entertainment applications.

Furthermore, the parental control system 1000 may include a storage device 1012 programmed to limit access to entertainment options based on the time-of-day. For instance, the storage device 1012 may be programmed to not permit access to entertainment applications during certain hours, e.g., between 9:00 p.m. and 7:00 a.m. Again, such data is communicated to the appropriate OS via the parental control IC 1002. By comparison to the computer system's own internal clock, the appropriate OS can detect if a particular child is attempting to access entertainment applications during the prohibited times and take appropriate action.

In addition to prohibiting access to certain entertainment applications based on content, time limits, or time-of-day prohibitions, the parental control system 1000 including the parental control IC 1002 can be utilized to track a particular child's use of entertainment applications. For instance, records of which videos were played or which audio files were played may be automatically stored in a specified storage area such as the external storage device 1012 or the hard disk drive of the computer system to name a couple. If Internet access is also available, such techniques can be utilized to create records indicating which web sites have been accessed.

Although the present invention has been described in terms of the exemplary embodiments provided herein, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A method of operating a PC, said method comprising:
    detecting a condition which indicates whether a hardware configuration change from a previous boot occurs;
    performing a BIOS boot process;
    loading an image file according to said condition;
    executing said image file;
    generating a second image file to be utilized in a subsequent boot if said condition indicates that said hardware configuration change from said previous boot occurs;
    operating said PC in an entertainment mode by a mini-OS (operating system);
    receiving at least one control command from a system memory in said entertainment mode by a special purpose circuit coupled between a south bridge and a codec; and
    transferring audio data according to said at least one control command if said PC operates in said entertainment mode.

2. The method of claim 1, wherein said image file comprises a supported hardware configuration.

3. The method of claim 1, wherein said BIOS boot process comprises:
    identifying a task that may be skipped; and
    skipping said task.

4. The method of claim 3, wherein said task comprises a hardware check.

5. The method of claim 3, wherein said BIOS boot process further comprises:
    identifying a deferrable task that may be deferred; and
    deferring said deferrable task to a later time.

6. The method of claim 5, wherein said deferrable task comprises reading data from a disk after said disk is spun up.

7. The method as claimed in claim 1, wherein said PC in said entertainment mode operates entertainment software applications selected from the group consisting of DVD playback applications, TV applications, digital device applications, remote control application, voice recording applications, and audio playback applications.

8. A method of operating a mini-OS configured to run a PC in an entertainment mode, said method comprising:
    determining whether said entertainment mode is desired;
    detecting a condition which indicates whether a present hardware configuration in a present entertainment mode boot differs from a previous hardware configuration in a previous entertainment mode boot;
    performing a BIOS boot process;
    loading an image file according to said detected condition;
    executing said image file thereby loading said mini-OS to enable operation of said PC in said entertainment mode;
    receiving at least one control command from a system memory in said entertainment mode by a special purpose circuit coupled between a south bridge and a codec; and
    transferring audio data according to said at least one control command if said PC operates in said entertainment mode.

9. The method of claim 8, wherein said image file comprises a supported hardware configuration.

10. The method of claim 8, wherein said BIOS boot process comprises:
    identifying a task that may be skipped; and
    skipping said task.

11. The method of claim 10, wherein said task comprises a hardware check for a piece of hardware not necessary for operation of said PC in said entertainment mode.

12. The method of claim 10, wherein said task comprises a memory test.

13. The method of claim 10, wherein said BIOS boot process further comprises:
    identifying a deferrable task that may be deferred; and
    deferring said deferrable task to a later time.

14. The method of claim 8, wherein said PC in said entertainment mode operates entertainment software applications selected from the group consisting of DVD playback applications, TV applications, digital device applications, remote control application, voice recording applications, and audio playback applications.

* * * * *